(12) United States Patent
Copeland

(10) Patent No.: US 12,001,972 B2
(45) Date of Patent: Jun. 4, 2024

(54) SEMANTIC INFERENCING IN CUSTOMER RELATIONSHIP MANAGEMENT

(71) Applicant: Accenture Global Solutions Limited, Dublin (IE)

(72) Inventor: Shannon L. Copeland, Atlanta, GA (US)

(73) Assignee: Accenture Global Solutions Limited, Dublin (IE)

(*) Notice: Subject to any disclaimer, the term of this patent is extended or adjusted under 35 U.S.C. 154(b) by 1128 days.

(21) Appl. No.: 16/177,423

(22) Filed: Oct. 31, 2018

(65) Prior Publication Data
US 2020/0134492 A1    Apr. 30, 2020

(51) Int. Cl.
| G06N 3/00 | (2023.01) |
| G06N 5/046 | (2023.01) |
| G06Q 30/016 | (2023.01) |
| G10L 15/18 | (2013.01) |
| G10L 15/22 | (2006.01) |
| G10L 15/30 | (2013.01) |

(52) U.S. Cl.
CPC ........... *G06N 5/046* (2013.01); *G06Q 30/016* (2013.01); *G10L 15/1822* (2013.01); *G10L 15/22* (2013.01); *G10L 15/30* (2013.01)

(58) Field of Classification Search
CPC .. G06N 5/046; G06Q 30/016; G10L 15/1822; G10L 15/22
See application file for complete search history.

(56) References Cited

U.S. PATENT DOCUMENTS

| 6,785,380 B2 | 8/2004 | Ribera |
| 6,829,603 B1 | 12/2004 | Chai et al. |
| 7,275,083 B1 | 9/2007 | Seibel et al. |
| 7,486,785 B2 | 2/2009 | Flores |
| 8,108,237 B2 | 1/2012 | Bourne et al. |
| 8,332,279 B2 | 12/2012 | Woolston |
| 8,411,843 B1 | 4/2013 | Cyriac |
| 9,049,295 B1 | 6/2015 | Cooper |
| 9,165,556 B1 | 10/2015 | Sugar |
| 9,848,082 B1 | 12/2017 | Lilland |
| 9,860,391 B1 | 1/2018 | Wu et al. |

(Continued)

FOREIGN PATENT DOCUMENTS

| CN | 107506372 | 12/2017 |
| KR | 1020180058877 | 7/2018 |
| WO | 2016139666 A1 | 9/2016 |

OTHER PUBLICATIONS

International Search Report and Written Opinion dated Dec. 30, 2019 for related PCT/US2019/062629.

(Continued)

*Primary Examiner* — Rasha S Al Aubaidi
(74) *Attorney, Agent, or Firm* — Fish & Richardson P.C.

(57) ABSTRACT

Customer relationship management ("CRM") implemented in a computer system, including parsing, by a parsing engine of the computer system into parsed triples of a description logic, words of a CRM event from an incoming stream of CRM events, the CRM event characterized by an event type, the stream implemented in a CRM application of the computer system; and inferring, by an inference engine from the parsed triples according to inference rules specific to the event type, inferred triples.

20 Claims, 15 Drawing Sheets

(56) References Cited

U.S. PATENT DOCUMENTS

| | | | |
|---|---|---|---|
| 9,948,783 | B1 | 4/2018 | Farrell |
| 10,026,092 | B2 | 7/2018 | Heater et al. |
| 10,101,976 | B2 | 10/2018 | Cavalcante |
| 10,303,466 | B1 | 5/2019 | Karman |
| 10,482,384 | B1 | 11/2019 | Stoilos |
| 2003/0126136 | A1 | 7/2003 | Omoigui |
| 2004/0143473 | A1 | 7/2004 | Tivey et al. |
| 2005/0005266 | A1 | 1/2005 | Datig |
| 2005/0044357 | A1 | 2/2005 | Fano |
| 2005/0105712 | A1 | 5/2005 | Williams et al. |
| 2006/0095273 | A1 | 5/2006 | Montvay et al. |
| 2006/0098625 | A1 | 5/2006 | King |
| 2006/0239439 | A1 | 10/2006 | Blackwood |
| 2007/0019618 | A1 | 1/2007 | Shaffer |
| 2007/0064913 | A1 | 3/2007 | Shaffer |
| 2007/0094183 | A1 | 4/2007 | Paek et al. |
| 2007/0233561 | A1 | 10/2007 | Golec |
| 2008/0162498 | A1 | 7/2008 | Omoigui |
| 2008/0275744 | A1 | 11/2008 | Macintyre et al. |
| 2009/0012826 | A1* | 1/2009 | Eilam .............. G06Q 30/0202 705/7.29 |
| 2009/0070322 | A1 | 3/2009 | Salvetti |
| 2009/0245500 | A1 | 10/2009 | Wampler |
| 2009/0271192 | A1 | 10/2009 | Marquette |
| 2010/0036788 | A1 | 2/2010 | Wu |
| 2010/0063799 | A1 | 3/2010 | Jamieson |
| 2010/0114563 | A1 | 5/2010 | Choi |
| 2011/0077999 | A1 | 3/2011 | Becker et al. |
| 2011/0082829 | A1 | 4/2011 | Kolovski |
| 2011/0113094 | A1 | 5/2011 | Chunilal |
| 2011/0206198 | A1 | 8/2011 | Freedman |
| 2011/0264451 | A1 | 10/2011 | Hoepfinger |
| 2012/0059776 | A1 | 3/2012 | Estes |
| 2012/0078636 | A1 | 3/2012 | Ferrucci |
| 2012/0233558 | A1 | 9/2012 | Naim |
| 2012/0275642 | A1 | 11/2012 | Aller |
| 2013/0091090 | A1 | 4/2013 | Spivack et al. |
| 2013/0006916 | A1 | 6/2013 | McBride |
| 2013/0163731 | A1 | 6/2013 | Yan |
| 2013/0204663 | A1 | 8/2013 | Kahlow |
| 2014/0022328 | A1 | 1/2014 | Gechter et al. |
| 2014/0081934 | A1 | 3/2014 | Mizell |
| 2014/0122535 | A1 | 5/2014 | Gerard |
| 2014/0164502 | A1 | 6/2014 | Khodorenko |
| 2014/0189680 | A1 | 7/2014 | Kripalani |
| 2014/0201234 | A1 | 7/2014 | Lee et al. |
| 2014/0270108 | A1 | 9/2014 | Riahi et al. |
| 2014/0278343 | A1 | 9/2014 | Tran |
| 2014/0314225 | A1 | 10/2014 | Riahi et al. |
| 2014/0372630 | A1 | 12/2014 | Bostick |
| 2014/0379755 | A1 | 12/2014 | Kuriakose |
| 2015/0012350 | A1 | 1/2015 | Li et al. |
| 2015/0066479 | A1 | 3/2015 | Pasupalak |
| 2015/0189085 | A1 | 7/2015 | Riahi et al. |
| 2015/0201077 | A1 | 7/2015 | Konig et al. |
| 2015/0242410 | A1 | 8/2015 | Pattabhiraman et al. |
| 2015/0261743 | A1 | 9/2015 | Sengupta |
| 2015/0294405 | A1 | 10/2015 | Hanson |
| 2015/0348551 | A1 | 12/2015 | Gruber |
| 2015/0379603 | A1 | 12/2015 | Gupta |
| 2016/0019882 | A1 | 1/2016 | Matula |
| 2016/0021181 | A1 | 1/2016 | Ianakiev et al. |
| 2016/0034457 | A1 | 2/2016 | Bradley |
| 2016/0036981 | A1 | 2/2016 | Hollenberg |
| 2016/0036982 | A1 | 2/2016 | Ristock |
| 2016/0036983 | A1 | 2/2016 | Korolev |
| 2016/0117593 | A1 | 4/2016 | London |
| 2016/0162474 | A1 | 6/2016 | Agarwal |
| 2016/0162913 | A1 | 6/2016 | Linden et al. |
| 2016/0171099 | A1 | 6/2016 | Lorge et al. |
| 2016/0188686 | A1 | 6/2016 | Hopkins |
| 2016/0189028 | A1 | 6/2016 | Hu et al. |
| 2016/0217479 | A1 | 7/2016 | Kashyap et al. |
| 2016/0239851 | A1 | 8/2016 | Tanner |
| 2016/0321748 | A1 | 11/2016 | Mahatm |
| 2017/0017694 | A1 | 1/2017 | Roytman et al. |
| 2017/0024375 | A1 | 1/2017 | Hakkani-Tur |
| 2017/0091390 | A1 | 3/2017 | Joul |
| 2017/0124193 | A1 | 5/2017 | Li |
| 2017/0147635 | A1 | 5/2017 | McAteer et al. |
| 2017/0154108 | A1 | 6/2017 | Li et al. |
| 2017/0177715 | A1 | 6/2017 | Chang |
| 2017/0200220 | A1 | 7/2017 | Nicholson |
| 2017/0195488 | A1 | 8/2017 | Pendyaia |
| 2017/0262429 | A1 | 9/2017 | Harper |
| 2017/0262530 | A1 | 9/2017 | Okura |
| 2017/0293610 | A1 | 10/2017 | Tran |
| 2018/0054464 | A1 | 2/2018 | Zhang et al. |
| 2018/0082183 | A1 | 3/2018 | Hertz et al. |
| 2018/0115644 | A1 | 4/2018 | Al-Khaja |
| 2018/0144250 | A1 | 5/2018 | Kwon |
| 2018/0150459 | A1 | 5/2018 | Farid |
| 2018/0288098 | A1 | 10/2018 | Wang |
| 2018/0300310 | A1 | 10/2018 | Shinn |
| 2018/0315000 | A1 | 11/2018 | Kulkarni |
| 2018/0315001 | A1 | 11/2018 | Garner |
| 2018/0338040 | A1 | 11/2018 | Carly |
| 2018/0365772 | A1 | 12/2018 | Thompson |
| 2018/0376002 | A1 | 12/2018 | Abraham |
| 2019/0042988 | A1 | 2/2019 | Brown |
| 2019/0080370 | A1 | 3/2019 | Copeland |
| 2019/0188617 | A1 | 6/2019 | Copeland |
| 2019/0206400 | A1 | 7/2019 | Cui |
| 2019/0220794 | A1 | 7/2019 | Kulkarni |
| 2019/0340294 | A1 | 11/2019 | Spangler |
| 2020/0042642 | A1 | 2/2020 | Bakis |
| 2020/0074316 | A1* | 3/2020 | Ma ...................... G06F 16/9024 |
| 2020/0097814 | A1 | 3/2020 | Devesa |
| 2020/0110835 | A1 | 4/2020 | Zhao |

OTHER PUBLICATIONS

International Search Report and Written Opinion dated Jan. 9, 2020 for related PCT/US2019/055488.

International Search Report and Written Opinion dated Jan. 14, 2020 for related PCT/US2019/060174.

International Search Report and Written Opinion dated Jan. 17, 2020 for related PCT/US2019/058997.

International Search Report and Written Opinion dated Mar. 9, 2020 for related PCT/US2019/059949.

International Search Report and Written Opinion dated Apr. 1, 2020 for related PCT/US2019/055483.

Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.

Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

Jan. 10, 2020 Office Action for corresponding U.S. Appl. No. 15/700,210.

Mar. 5, 2020 Office Action for corresponding U.S. Appl. No. 16/183,736.

Jan. 25, 2020 Office Action for corresponding U.S. Appl. No. 15/844,512.

Jul. 25, 2019 Office Action for related U.S. Appl. No. 16/198,742.

International Search Report dated Nov. 28, 2018 for PCT/US2018/049813.

International Search Report dated Feb. 22, 2019 for PCT/US2018/065584.

Final Office Action dated Jul. 7, 2020 for corresponding U.S. Appl. No. 15/700,210.

Final Office Action dated Jul. 27, 2020 for corresponding U.S. Appl. No. 15/844,512.

Final Office Action dated Jul. 30, 2020 for corresponding U.S. Appl. No. 16/154,718.

(56) References Cited

OTHER PUBLICATIONS

Non-Final Office Action dated May 4, 2020 for corresponding U.S. Appl. No. 16/154,718.
Non-Final Office Action dated Sep. 29, 2020 for corresponding U.S. Appl. No. 16/157,075.
Non-Final Office Action dated Sep. 30, 2020 for corresponding U.S. Appl. No. 16/911,717.
Kertkeidkachorn et al., "An Automatic Knowledge Graph Creation Framework from Natural Language Text," IEICE Transactions on Information and Systems, Jan. 2018, E101-D(1):90-98.
Office Action in Australian Appln. No. 2019374056, dated Feb. 17, 2023, 6 pages.

* cited by examiner

SEMANTIC INFERENCING IN CUSTOMER RELATIONSHIP MANAGEMENT

BACKGROUND

Customer Relationship Management ('CRM') is an approach to managing a company's interaction with current and potential customers. It uses data analysis about customers' history with a company to improve business relationships with customers, specifically focusing on customer retention and sales growth. CRM systems compile data from a range of different communication channels, including a company's website, telephone, email, live chat, marketing materials, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales. Some CRM software is available through cloud systems, software as a service (SaaS), delivered via network and accessed via a browser instead of installed on a local computer. Businesses using cloud-based CRM SaaS typically subscribe to such CRM systems, paying a recurring subscription fee, rather than purchasing the system outright.

Despite being huge systems, most CRM systems available today lack the infrastructure to properly make use of the information they can access. Inference rules, for example, are often run against a complete data set to determine additional relationships among entities stored in a huge knowledge graph. An explanatory example is the ability to infer the relationship of sibling among two entities that have the same parents. Only the entities and their parents need to be stored in the database to infer which entities are siblings. This simple example of inference, however, can be duplicated billions of times in a large knowledge base, so that running rules of inference against a massive knowledge base can be very expensive. There is thus an ongoing need for CRM systems with improved infrastructure.

DETAILED DESCRIPTION OF EXAMPLE EMBODIMENTS

Figure 1:
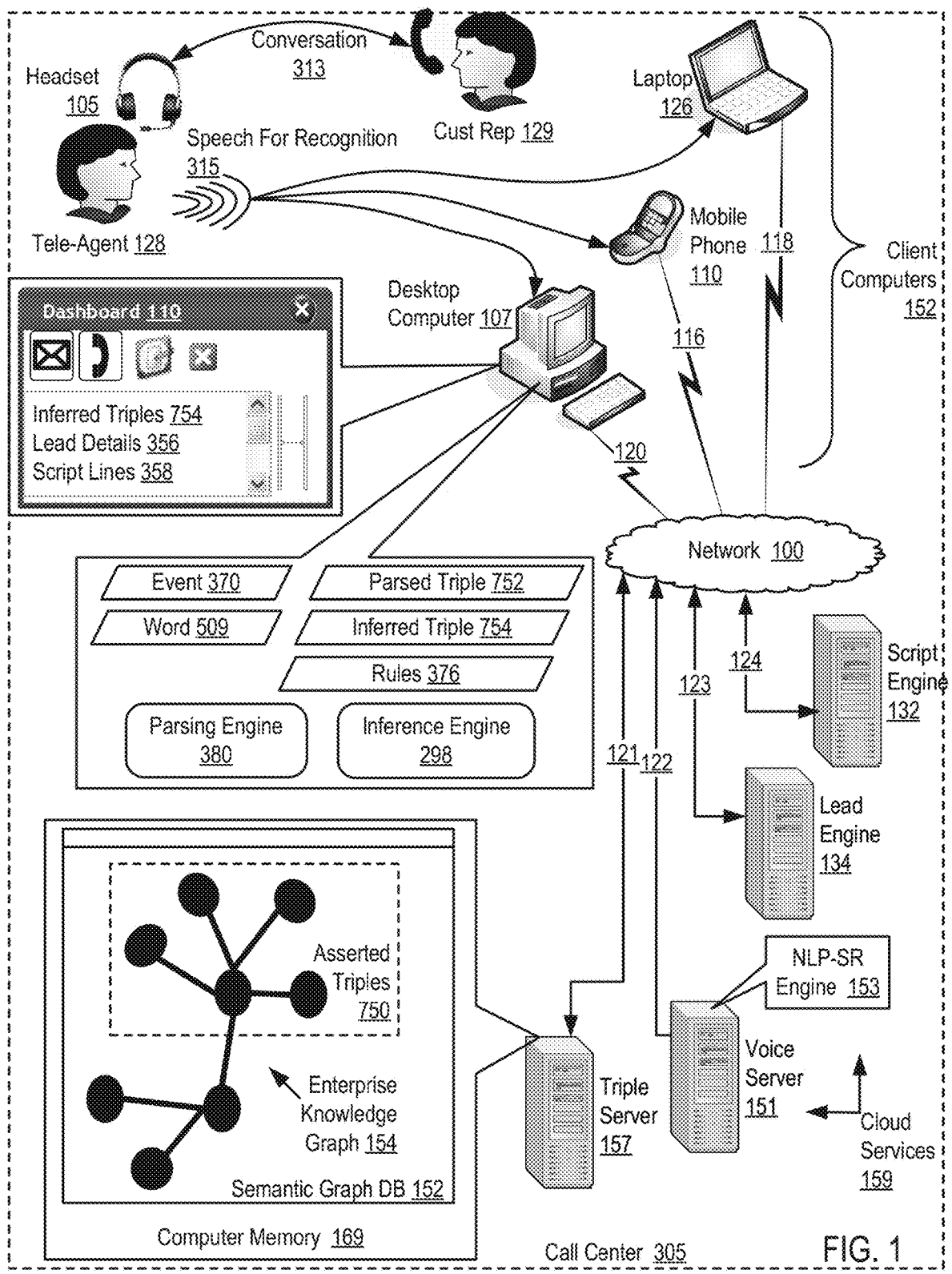
FIG. 1 sets forth a network diagram illustrating an example system for customer relationship management ("CRM") according to embodiments of the present invention.

Example methods and apparatus for customer relationship management ("CRM") implemented in a computer system are described with reference to the accompanying drawings, beginning with FIG. 1. FIG. 1 sets forth a network diagram illustrating an example computer system for CRM according to embodiments of the present invention. CRM in the example of FIG. 1 is implemented with at least one client computer (152), a triple server (157), a voice server (151), a lead engine (134), and a script engine (132). A client computer is automated computing machinery configured for CRM with CRM-related I/O through a CRM-designed dashboard (110) as well as typically also speech enablement, accepting and recognizing speech from a user and expressing to a user voice prompts and speech responses. Such devices are referred to as client devices because they implement the client side of computer architectures that carry out CRM according to embodiments. Client computers in the example of FIG. 1 include a desktop computer (107), a mobile phone (110), and a laptop computer (126), any or all of which can server as a workstation for a tele-agent carrying out CRM in, for example, a call center (305). The client computers are coupled for data communications through wireless connections (116, 118, 120) and through network (100) to the triple server (157), the voice server (151), the lead engine (134), and the script engine (132).

A lead engine (134) is automated computing machinery that gathers leads from various resources and provides them to a tele-agent through a GUI for use with customers and prospective customers. A lead is structured data representing a customer or potential customer typically including a lead ID, lead name, company, role of the lead, address of the lead or company, phone number of the lead and other relevant information as will occur to those of skill in the art. Such a lead may be implemented as a record, message, object, or other data structure useful to automated computing machinery for automatic lead generation and presentation through a GUI to a tele-agent.

A script engine (206) is automated computing machinery that creates in real-time a dynamic script for a tele-agent to use in communicating with a customer. A dynamic script is a script that changes in real-time in dependence upon various factors such as current industry trend data and often the specific products that the tele-agents supports and the products that the customer does or does not have. That is, the dynamic script is dynamic in the sense that it changes in real-time based on industry trends. The sentences in the script are dynamically reordered, added, or deleted in real-time for the benefit of the customer. Such sentences may be dynamically altered in the script by being dynamically reordered or created in real-time, retrieved from a repository of relevant industry and software descriptions, provided by other tele-agents, or in other ways as will occur to those of skill in the art.

Automated computing machinery, as that phrase is used in this specification, means a module, segment, or portion of code or other automated computing logic, hardware, software, firmware, or the like, as well as a combination of any of the aforementioned, local or remote. Automated computing machinery is often implemented as executable instructions, physical units, or other computing logic for implementing specified logical functions.

A tele-agent (128) is a person, an agent of a call center, responsible for selling or supporting commercial products and services. A customer representative (129) is a person who represents a customer, a company or other enterprise that is a current or prospective purchaser of goods or services of a call center.

A call center (305) is an organization of personnel and computer resources that provide CRM according to embodiments of the present invention. In the example of FIG. 1, a dotted line indicates the extent of the call center (305). The extent is logical rather than physical. All of the resources and personnel that make up the call center can have the same physical location, or the call center can be highly virtualized, with separate physical locations for tele-agents and for servers, for example. All or some of the tele-agents can work from home offices. Script and lead engines may be located in data centers separate from data centers that house triple servers and voice servers. And so on.

A semantic graph database (152) is a database that uses graph structures for semantic queries with nodes, edges and properties to represent and store data. A key concept of this database system is the graph (or edge or relationship), which directly relates data items in a data store. The relationships allow data in the store to be linked together directly, and in many cases retrieved with one operation.

Such a graph database contrasts with conventional relational databases, where links between data are stored in the data, and queries search for this data within the store and use the join concept to collect the related data. Graph databases, by design, allow simple and fast retrieval of complex hierarchical structures that are difficult to model in relational systems.

The underlying storage mechanism of graph databases can vary. Some depend on a relational engine and store the graph data in a table. Others use a key-value store or document-oriented database for storage, making them inherently NoSQL structures.

Retrieving data from a graph database often requires a query language other than SQL, which was designed for relational databases and does not elegantly handle traversing a graph. There are a number of systems, most often tightly tied to one product and there are some multi-vendor query languages like Gremlin, SPARQL, and Cypher. In addition to having query language interfaces, some graph databases are accessed through application programming interfaces (APIs).

Graph databases are based on graph theory, and employ nodes, edges, and properties. Nodes represent entities such as people, businesses, accounts, or any other item to be tracked. They are roughly the equivalent of the record, relation, or row in a relational database, or the document in a document database. Edges, also termed graphs or relationships, are the lines that connect nodes to other nodes; they represent the relationship between them. Meaningful patterns emerge when examining the connections and interconnections of nodes, properties, and edges. Edges are the key concept in graph databases, representing an abstraction that is not directly implemented in other systems. Properties are germane information that relate to nodes. For example, if N3 were one of the nodes, it might be tied to properties such as web-services support, cloud-computing, or a word that starts with the letter N, depending on which aspects of N3 are germane to a given database.

The graph database of FIG. 1 is a semantic graph database and stored within it is an enterprise knowledge graph (154). The example enterprise knowledge graph of FIG. 1 can be, for example, implemented using the Resource Description Framework ('RDF'). In such an implementation, the enterprise knowledge graph has each data item represented by a resource identifier. Such resource identifiers may include a uniform resource identifier ('URI'), an internationalized resource identifier ('IRI'), a uniform resource locator ('URL'), a literal, a non-literal, or any other resource identifier. RDF makes resource identifier relationships between data items the central attribute of its overall data model. Resource identifiers, such as URI's, are created with data and liked together using relationships that are also named with resource identifiers.

The enterprise knowledge graph (1545) of FIG. 1 has characteristics of mathematical directed graphs in that it is composed of vertices (a.k.a. nodes) and directed edges. Each edge connects two vertices, has a type, and can have one or more properties. Each property is a key-value pair. The ability to type an edge and attach properties to it increases the semantic expressiveness of the knowledge graphs. This description of graph databases and semantic graph databases is for explanation and not for limitation. In fact, alternative embodiments may include relational databases, Non-SQL data stores, files, text documents, spreadsheets, and other viable database structures.

Computer memory (169) can include cache, random access memory ("RAM"), disk storage, and so on, most forms of computer memory. Computer memory so configured typically resides upon speech-enabled devices, or, as shown here (169), upon one or more triple servers (157).

Words (509) of events (370) can be words of digitized speech for recognition (315) from a conversation (313). The speech for recognition can be the entire conversation, where, for example, both persons speaking are in the same room, and the entire conversation is picked up by a microphone on a speech-enabled device. The scope of speech for recognition can be reduced by providing to a speech-enabled device only one side of the conversation, as only through a microphone on a headset (105). The scope of speech for recognition can be further reduced by providing for recognition only speech that responds to a prompt from a VoiceXML dialogue executing on a client computer. As the scope of speech for recognition is reduced, data processing burdens are reduced across the system as a whole, although it remains an option, in some embodiments at least, to recognize the entire conversation and stream across a display (110) a flow of all words in the conversation.

Speech from the conversation (313) is recognized into digitized words by operation of a natural language processing speech recognition ("NLP-SR") engine (153), shown here disposed upon a voice server (151), but also amenable to installation on speech-enabled client computers. In addition to digitizing the word (509) by speech recognition functions of a voice server (151), for a further example, the word (509) can be digitized by operation of widgets of a graphical user interface (110). Or, for an even further example, the word (509) can be digitized by a user's (128) typing it into a text entry box (366) of a graphical user interface (110).

The overall example computer system illustrated in FIG. 1 operates generally to implement CRM according to embodiments of the present invention by parsing, by a parsing engine (380) of the computer system into parsed triples (752) of a description logic, words (509) of a CRM event (370) from an incoming stream of CRM events. A CRM event is an activity that generates digitized words for parsing and inferencing into triples that usefully can be included in an enterprise knowledge graph. Examples of such events include activities that generate digital representations of new customers, new customer representatives, and new call notes. A CRM event can be scoped by user input, as, for example, activation of a button widget on a dashboard designating a customer-related event, a customer rep event, a call notes event, and so on. CRM events thus are characterized by event types, a customer event, a rep event, a call notes event, and so on. A stream of CRM events is implemented in a CRM application of the computer system (not shown in FIG. 1).

The system of FIG. 1 operates further by inferring, by an inference engine (298) from the parsed triples (752) according to inference rules (376) specific to the event type, inferred triples (754). In some embodiments, the system joins previously asserted triples (750) from an enterprise knowledge graph (154) and the parsed triple (752) and infers according to event-specific inference rules (376) inferred triples (754) from the combination of the asserted triples (750) and the parsed triples (752). The system of FIG. 1 typically operates further then to store the parsed triples (752) and the inferred triples (754) in the enterprise knowledge graph for use in CRM according to embodiments.

The parsed triple (752) is a semantic triple composed of, for example, a subject, a predicate, and an object, that is 'parsed' in the sense that it is composed from elements derived from recognized speech, selections from GUI widgets, text typed through a GUI, or the like. That is, "parsing" means taking components from various sources and forming them into semantic triples. Parsing can include forming into semantic triples raw text from data entry or conversational speech that is processed by an NLP-SR engine into parts of speech. Such parts of speech can be formed into triples by placing each part appropriately as subject-predicate-object in a triple.

The inferred triple (754) is inferred from the parsed triple (752) according to inference rules specific to an event type, the type of the event that composed the words from which the triple was parsed. Inferencing is a process by which new triples are systematically added to a graph based on patterns in existing triples. Information integration, inclusion of newly inferred triples, can be achieved by invoking inferencing before or during a query process. A query executed with inference rules in an engine designed not only for queries but also for inferencing, returns not only asserted data but also inferred information. Readers will recognize that all such references to "data" or "information" or "knowledge" are in fact references to semantic triples.

Here is an example of an inference rule:

| IF | { <A> <is a subclass of> <B> } |
| AND | { <x> <is of type> <A> } |
| THEN | { <x> <is of type> <B> } |

In plain language, this rule says that if class A is a subclass of class B, anything of type A is also of type B. We refer to this rule as a 'type propagation rule,' A is a subclass of B, x is an A, x is also a B. Or in a SPARQL CONSTRUCT query, this type propagation rule can be expressed:

| CONSTRUCT | { ?R :type ? B} |
| WHERE | { ?A :subClassOf ? B . |
| | ?R :type ? A } |

For further explanation, assume these example triples are previously asserted:

| <Henleys> | <subClassOF> | <Shirts> |
| <Shirts> | <subClassOF> | <MensWear> |
| <Blouses> | <subClassOF> | <WomensWear> |
| <Oxfords> | <subClassOF> | <Shirts> |
| <Tshirts> | <subClassOF> | <Shirts> |
| <ChamoisHenley> | <isOfType> | <Henleys> |
| <ClassicOxford> | <isOfType> | <Oxfords> |
| <ClassicOxford> | <isOfType> | <Shirts> |
| <BikerT> | <isOfType> | <Tshirts> |
| <BikerT> | <isOfType> | <MensWear> |

Applying the type propagation rule results in the following inferences:

| <ChamoisHenley> | <isOfType> | <Shirts> |
| <ChamoisHenley> | <isOfType> | <MensWear> |
| <ClassicOxford> | <isOfType> | <Shirts> |
| <ClassicOxford > | <isOfType> | <MensWear> |
| <BikerT> | <isOfType> | <Shirts> |
| <BikerT> | <isOfType> | <MensWear> |

Two of the inferred triples were also previously asserted:

| <ClassicOxford> | <isOfType> | <Shirts> |
| <BikerT> | <isOfType> | <MensWear> |

And here, for an inference engine that simply inserts the inferred triples back into the asserted graph, is the new graph, with inferred triples in bold italics:

| <Henleys> | <subClassOF> | <Shirts> |
| <Shirts> | <subClassOF> | <MensWear> |
| <Blouses> | <subClassOF> | <WomensWear> |
| <Oxfords> | <subClassOF> | <Shirts> |
| <Tshirts> | <subClassOF> | <Shirts> |
| <ChamoisHenley> | <isOfType> | <Henleys> |
| <ChamoisHenley> | <isOfType> | <Shirts> |
| <ChamoisHenley> | <isOfType> | <MensWear> |
| <ClassicOxford> | <isOfType> | <Oxfords> |
| <ClassicOxford> | <isOfType> | <Shirts> |
| <ClassicOxford> | <isOfType> | <MensWear> |
| <BikerT> | <isOfType> | <Tshirts> |
| <BikerT> | <isOfType> | <MensWear> |
| <BikerT> | <isOfType> | <Shirts> |

The underlying purpose of such inferencing is to create data that are more connected, better integrated, and in which the consistency constraints on the data are expressed in the data itself. The data itself describes how the data can be used. For purposes of making data more integrated and consistent, simple inferences like those just described are often more useful than elaborate ones, not very exciting, but really useful. It is this kind of workaday consistency completion of CRM data that can be done with inferencing according to embodiments. Although inferencing of this kind may seem at first glance to have little significance, in fact, this kind of inferencing is exactly the kind of correlation that effects consistency in large data stores.

In this paper, "asserted triples" are triples previously asserted and residing in an enterprise knowledge graph. When a subgraph of the enterprise knowledge graph is used for inferencing in CRM according to embodiments, the triples in such a subgraph are referred to as "asserted triples." In this paper, "parsed triples" are triples parsed in real time from words of a CRM event as or promptly after the event occurs. Possibly many of the triples in the enterprise knowledge graph were parsed at some point, but, nevertheless, for clarity of description in this paper, triples already in the enterprise knowledge graph are "asserted triples," and triples just now parsed from words of an event are "parsed triples." "Inferred triples" are triples inferred in real time from parsed triples as a CRM event occurs or promptly afterwards. Possibly many of the triples in the enterprise knowledge graph were inferred at some point, but, nevertheless, for clarity of description in this paper, triples already in the enterprise knowledge graph are "asserted triples," and triples just now inferred from triples parsed from words of an event are "inferred triples."

There is no structural, functional, or logical difference among these triples. Asserted triples, parsed triples, inferred triples, they are all exactly the same kind of entity. The labels "asserted," "parsed," and "inferred" are used here merely for ease of explanation, not for identifications of differences in kind. All of these triples are three-part expressions of information conforming to some form of defined logic, often a description logic, often a logic that supports decidability.

In embodiments, the enterprise knowledge graph (154) may include all or most information describing or pertinent to or useful in an entire corporate enterprise, financials, business entities and structures, employee data, incorporation data, transactions, contracts, sales history, product descriptions, and so on, and so on. Thus, CRM information is a subset of overall corporate information, and asserted, parsed, and inferred triples are subsets of CRM information. The present description of triples as subgraphs of an overall enterprise knowledge graph is for explanation rather than limitation. In some embodiments at least, for various reasons, CRM data, customer data, information related to customer representatives, or call note data can be implemented in separate graphs rather than subgraphs. In the example of FIG. 1, the enterprise knowledge graph (154) is implemented in semantic triples organized and connected according to at least one form of semantic logic, such as, for example, a predicate logic or a description logic. In the example of FIG. 1, the enterprise knowledge graph is composed of semantic triples of a defined logic that includes all CRM-related knowledge that is available to a tele-agent through the overall computer system. The triples are semantic triples in the sense that such triples have meanings defined by inferences, inferences expressly described in additional triples, which are here referred to as "inferred triples."

A triple (750, 752, 754) is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role. In this paper, the elements of a triple are referred to as subject, predicate, and object—and expressed like this: <subject> <predicate> <object>—or like this: (subject predicate object)—or in other abstract forms intended to be easily read by a human. There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets or parenthesis, is a form of abstract syntax, optimized for human readability rather than machine processing, although its substantive content is correct for expression of triples. Using this abstract syntax, here are examples of triples:

<Bob> <is a> <person>
    <Bob> <is a friend of> <Alice>
    <Bob> <is born on> <the $4^{th}$ of July 1990>
    <Bob> <is interested in> <the Mona Lisa>
    <the Mona Lisa> <was created by> <Leonardo da Vinci>
    <the video 'La Joconde a Washington'> <is about> <the Mona Lisa>

The same item can be referenced in multiple triples. In this example, Bob is the subject of four triples, and the Mona Lisa is the subject of one triple and the object of two. This ability to have the same item be the subject of one triple and the object of another makes it possible to effect connections among triples, and connected triples form graphs.

Figure 2:
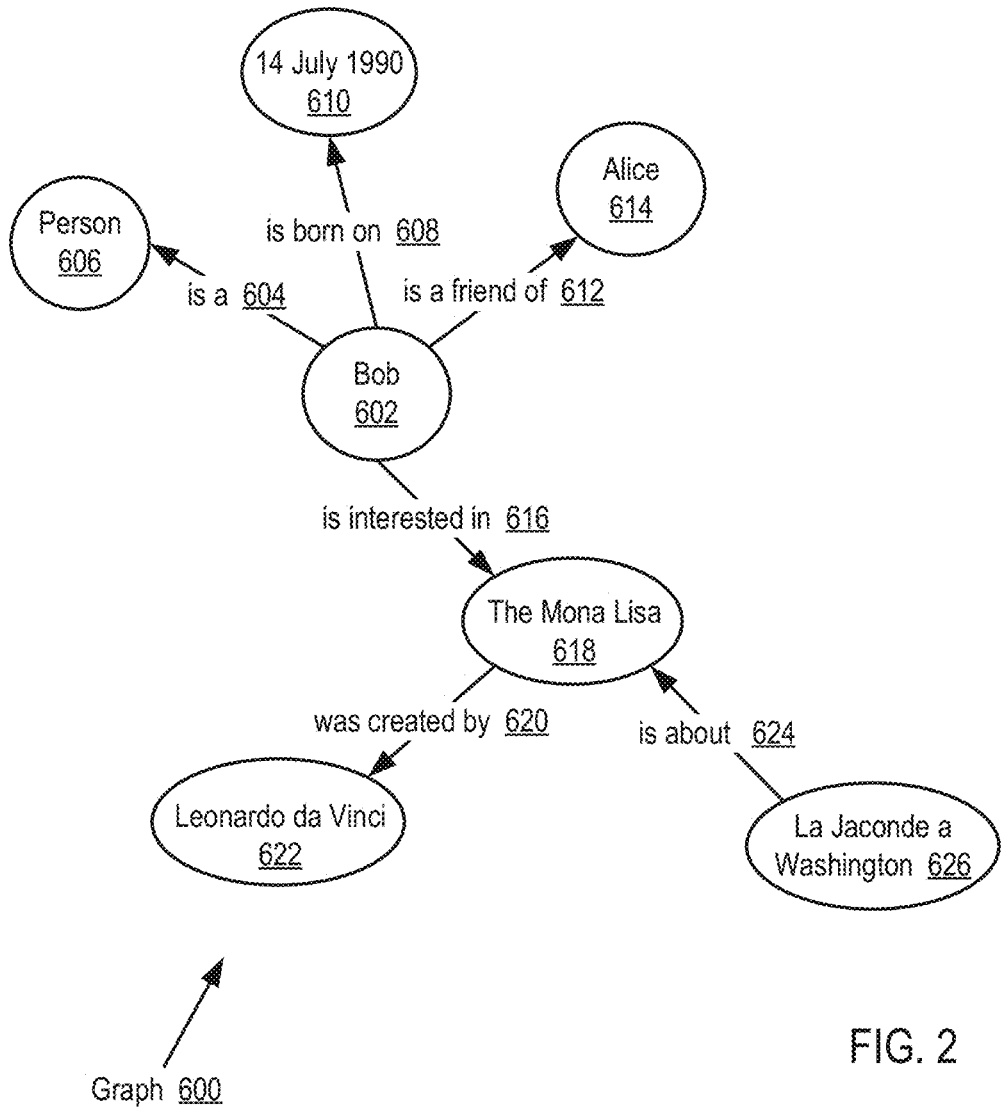
FIG. 2 sets forth a line drawing of an example graph of semantic triples.

For further explanation of relations among triples and graphs, FIG. 2 sets forth a line drawing of a graph (600). The example graph of FIG. 2 implements in graph form the example triples set forth above regarding Bob and the Mona Lisa. In the example of FIG. 2, the graph edges (604, 608, 612, 616, 620, 624) represent respectively relations among the nodes, that is, represent the predicates <is a>, <is a friend of>, <is born on>, <is interested in>, <was created by>, and <is about>. The nodes themselves represent the subjects (602, 618, 626) and objects (606, 610, 614, 618, 622) of the triples, <Bob>, <person>, <Alice>, <the $4^{th}$ of July 1990>, <the Mona Lisa>, <Leonardo da Vinci>, and <the video 'La Joconde a Washington'>. The node (618) representing the Mona Lisa is both a subject and an object. The node (618) representing the Mona Lisa is an object of the triple (602, 616, 618) that describes Bob's interest. The node (618) representing the Mona Lisa is a subject of the triple (618, 620, 622) that describes the Mona Lisa's creation by Leonardo.

In systems of knowledge representation, knowledge is represented in graphs of triples, including, for example, knowledge representations implemented in Gremlin, in Cypher, in Prolog databases, in Lisp data structures, or in RDF-oriented ontologies in RDFS, OWL, and other ontology languages. Search and inference are effected against such graphs by search engines configured to execute semantic queries and semantic inference in, for example, Gremlin, Cypher, Prolog, Lisp, or SPARQL.

Gremlin is a query language provided through the TinkerPop graph computing framework from the Apache Foundation. Cypher is an AI program that generates SPARQL queries from natural language input, allowing users to speak plain language to update and query databases; Cypher brings its own grammar and lexicon to natural language processing. SPARQL is a recursive acronym for "SPARQL Protocol and RDF Query Language." Lisp is a reliable, flexible programming language that is widely used in artificial intelligence, knowledge representation, and semantic applications. Prolog is a general-purpose logic programming language. Prolog supports queries against connected triples expressed as statements and rules in a Prolog database. SPARQL supports queries against ontologies expressed in RDFS, OWL, or other RDF-oriented ontologies. Regarding Prolog, SPARQL, Cypher, Gremlin, Lisp, and so on, these are examples of technologies explanatory of example embodiments of the present invention. Thus, such are not limitations of the present invention. Knowledge representations useful according to embodiments can take many forms in the art, now or in the future, and all such are now and will continue to be well within the scope of the present invention.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries are disposed along a scale of semantics. A traditional web search, for example, is disposed upon a zero point of that scale, no semantics, no structure. A traditional web search against the keyword "derivative" returns thousands of HTML documents discussing the literary concept of derivative works as well as calculus procedures. A traditional web search against the keyword "differential" returns many web pages describing automobile parts and many web pages discussing calculus functions.

Other queries are disposed along mid-points of the scale, some semantics, some structure, not entirely complete. This is actually a current trend in web search. Such systems may be termed executable rather than decidable. From some points of view, decidability is not a primary concern. In many Web applications, for example, data sets are huge, and they simply do not require a 100 percent correct model to analyze data that may have been spidered, scraped, and converted into structure by some heuristic program that itself is imperfect. People use Google because it can find good answers a lot of the time, even if it cannot find perfect answers all the time. In such rough-and-tumble search environments, provable correctness is not a key goal.

Other classes of queries are disposed where correctness of results is important, and decidability enters. A user who is a tele-agent in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 3:
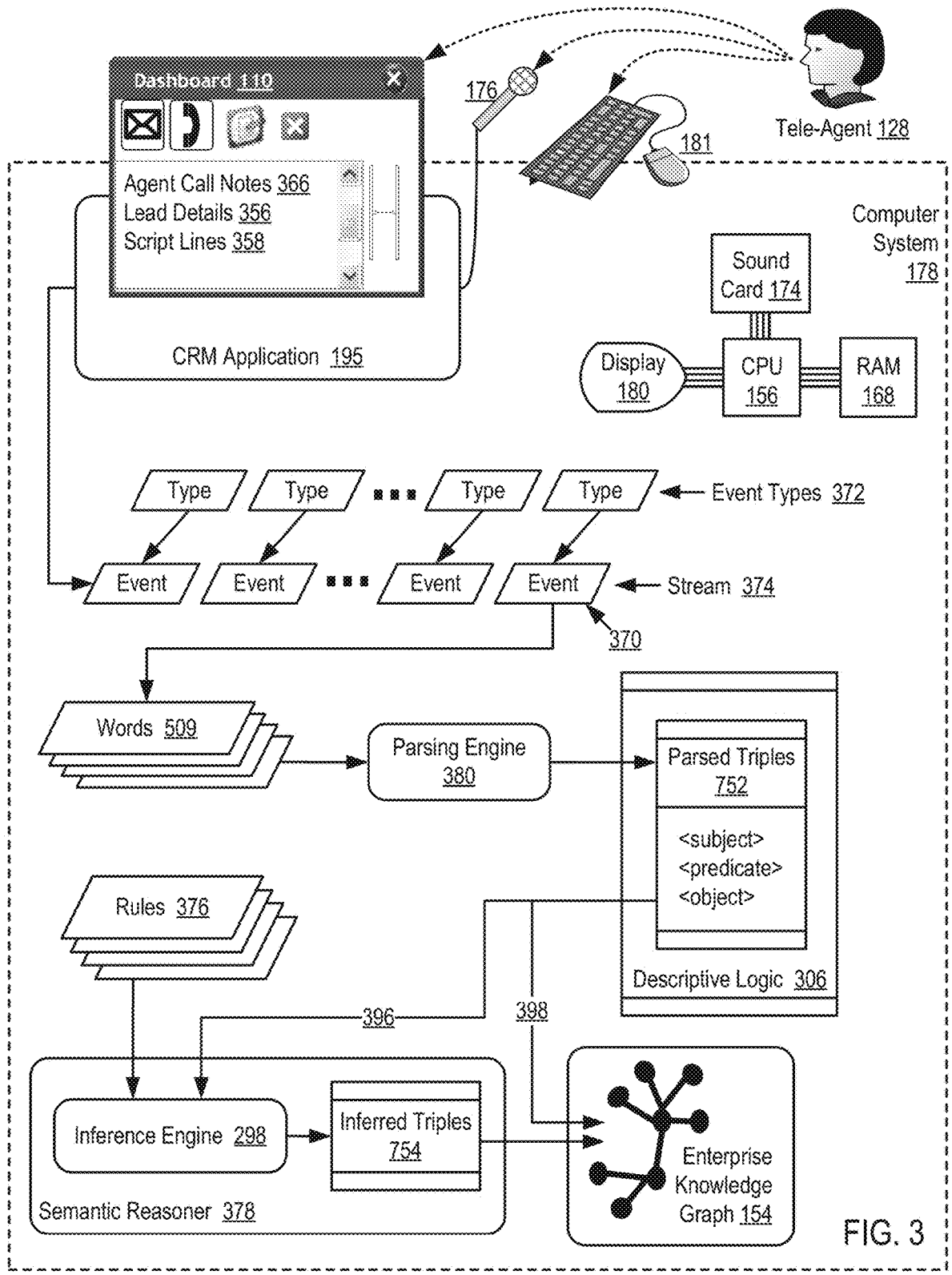
FIG. 3 sets forth a functional block diagram of an example computer system that implements CRM according to embodiments of the present invention.

For further explanation, FIG. 3 sets forth a functional block diagram of an example computer system (178) that implements CRM according to embodiments of the present invention. The example computer system of FIG. 3 includes a processor or "CPU" (156), random access memory or "RAM" (168), a sound card (174), and a display (180). The system includes a CRM application program (195), typically stored in RAM and executed on the CPU. The CRM application exposes through the display a graphical user interface or "GUI" in the form of a dashboard (110), which, by use of the sound card, audio equipment, keyboard, and mouse (181), in addition to the display, accepts and provides user I/O.

The example computer system illustrated in FIG. 3 operates generally to implement CRM according to embodiments of the present invention by parsing, by a parsing engine (380) of the computer system into parsed triples (752) of a description logic, words (509) of a CRM event (370) from an incoming stream (374) of CRM events. The system of FIG. 1 operates further by inferring, by an inference engine (298) from the parsed triples (752) according to inference rules (376) specific to the event type, inferred triples (754). The system of FIG. 1 typically operates further then to store the parsed triples (752) and the inferred triples (754) in the enterprise knowledge graph (154) for use in CRM according to embodiments. In this example, the parsed triples (752) therefore are both inputs (396) to inference (298) and also triples stored (398) in the enterprise knowledge graph (154).

In the example of FIG. 3, it is the CRM application (195) that generates the stream (374) of CRM events (370). A CRM event is an activity that generates digitized words (509) for parsing (380) and inferencing (298) into triples (752, 754) that usefully can be included in an enterprise knowledge graph (154). Taken, for example, as instances of an object-oriented event class, then, no doubt in addition to words, a CRM event would also include member methods, member data elements, and so on. Nevertheless, a CRM event is basically a container or wrapper for one or more words (509) for parsing and inference. Examples of CRM events include activities that generate digital representations of, that is, words describing, new customers, new customer representatives, new call notes, triples newly constructed by a user with GUI widgets, and so on. A CRM event can be scoped by user input, as, for example, activation of a button widget on a dashboard designating a customer-related event, a customer rep event, a call notes event, and so on. CRM events thus are characterized by event types (372), such as, for example, a customer event, a rep event, a call notes event, and so on.

In this example, the inference engine (298) operates in the context of a semantic reasoner (378). A semantic reasoner is a module of automation that expands an inference engine with enriched functionality. In this paper, it is generally assumed that query execution and inferencing are carried out by the same engine, a query and inference engine, often referred to simply as an inference engine. It is possible to configure a query engine separate from an inference engine, but for ease of explanation, in this paper, the query function and the inference function are combined in an "inference engine." With a reasoner, the functionality of the inference engine can be limited to query execution and inferencing. Additional functionality associated with queries and inferencing is provided by the semantic reasoner. Examples of such additional functionality include inserting parsed triples and inferred triples into an enterprise knowledge base, storing parsed or inferred triples as a separate graph for further processing, storing parsed and inferred triples into a new separate dataset such as for publication, serializing parsed and inferred triples for saving to a file, displaying parsed and inferred triples for administration by a user, and so on.

Figure 4:
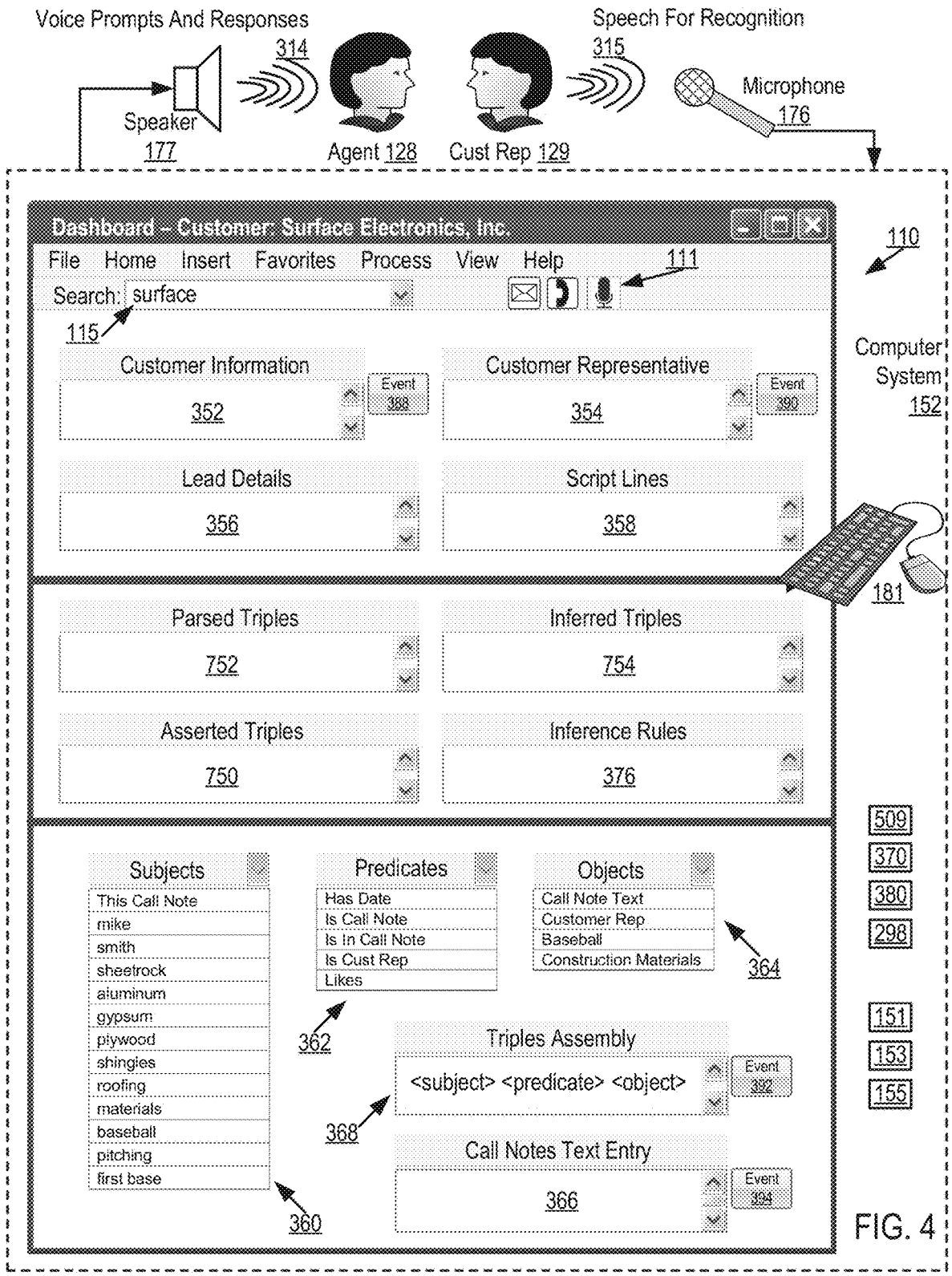
FIG. 4 sets forth a line drawing of an example dashboard that implements CRM according to embodiments of the present invention.

For further explanation, FIG. 4 sets forth a line drawing of an example dashboard (110) that implements CRM according to embodiments of the present invention. The dashboard is a graphical user interface ('GUI') of a computer system (152). The dashboard itself is a GUI exposed by a speech-enabled CRM application that provides to a tele-agent a front-end, an interface, for all pertinent functionality of a call center, leads, scripts, enterprise knowledge base, triple servers with semantic CRM stores, customer information, information on customer representatives, call notes stores, voice services, and so on, and so on.

The dashboard implements digital controls called widgets. A widget is a GUI element of interaction, such as a button or a scroll bar. Widgets are automated elements with which a user interacts with through direct manipulation to read or edit information or administer control. Each widget appears as a digital part of a GUI and facilitates a specific type of user-computer interaction. Some widgets support interaction with the user, for example, labels, buttons, and check boxes. Others act as containers that group widgets added to them, for example, windows, panels, and tabs. Examples of widgets optionally useful in CRM controls according to embodiment include buttons, radio buttons, check boxes, sliders, list boxes, spinners, drop-down lists, menus, menu bars, scroll bars, text boxes, dialog boxes, and so on.

In the example of FIG. 4, by use of a search widget (115), the dashboard has been navigated to point to customer information for a customer named Surface Electronics, Inc. The Customer Information scroll box widget (352) will display customer information (not shown) such as address, web page link, email, telephones, and so on. Similarly, the Customer Representative scroll box widget (354) will display (not shown) identities, contact information, and other information for each customer representative of Surface Electronics, Inc., with whom any tele-agent has spoken.

In the example of FIG. 4, by use of additional widgets, the dashboard generates CRM events (370) and hands them off to a parsing engine (380) and an inference engine (298) for further processing, displaying results of such processing is support of CRM operations by users. The dashboard accepts user inputs of words (509) describing customer information through scrolling text box widget (352), and, when an event widget button (388) is invoked, the dashboard gathers the input words into a CRM event (370) and passes the event to a parsing engine (380). The dashboard accepts user inputs of words (509) describing a customer representative through scrolling text box widget (354), and, when an event widget button (390) is invoked, the dashboard gathers into a CRM event (370) the input words describing the customer representative and passes the event to a parsing engine (380). The dashboard accepts user inputs of words (509) composing semantic triples through a triples assembly scrolling text box widget (352), and, when an event widget button (392) is invoked, the dashboard gathers the input words into a CRM event (370) and passes the event to a parsing engine (380). The dashboard accepts user inputs of words (509) describing a phone call between a tele-agent (128) and a customer representative (129) through call notes text entry scrolling text box widget (366), and, when an event widget button (394) is invoked, the dashboard gathers into a CRM event (370) the input words describing the phone call and passes the event to a parsing engine (380). Thus, a sequence of user operations of evert button widgets generates a stream of CRM events for processing by a parsing engine and an inference engine into parsed triples and inferred triples.

A parsing engine (380) and an inference engine (298) of the computer system (152) process words (5609) of CRM events (370) and display on the dashboard (110) in scrolling text box widgets the resulting parsed triples (752) and inferred triples (754). Asserted triples (750), if any, joined with parsed triples for inferencing are also displayed in a scrolling text box widget. And for user review or editing, the inference rules (376) used by the inference engine (298) to generate the inferred triples (754) are also displayed in a scrolling text box widget.

The overall example computer system illustrated in FIG. 1 operates generally to implement CRM according to embodiments of the present invention by parsing, by a parsing engine (380) of the computer system into parsed triples (752) of a description logic, words (509) of a CRM event (370) from an incoming stream of CRM events. A CRM event is an activity that generates digitized words for parsing and inferencing into triples that usefully can be included in an enterprise knowledge graph. Examples of such events include activities that generate digital representations of new customers, new customer representatives, and new call notes. A CRM event can be scoped by user input, as, for example, activation of a button widget on a dashboard designating a customer-related event, a customer rep event, a call notes event, and so on. CRM events thus are characterized by event types, a customer event, a rep event, a call notes event, and so on. A stream of CRM events is implemented in a CRM application of the computer system (not shown in FIG. 1).

The system of FIG. 1 operates further by inferring, by an inference engine (298) from the parsed triples (752) according to inference rules (376) specific to the event type, inferred triples (754). In some embodiments, the system joins previously asserted triples (750) from an enterprise knowledge graph (154) and the parsed triple (752) and infers according to event-specific inference rules (376) inferred triples (754) from the combination of the asserted triples (750) and the parsed triples (752). The system of FIG. 1 typically operates further then to store the parsed triples (752) and the inferred triples (754) in the enterprise knowledge graph for use in CRM according to embodiments.

The dashboard in the example of FIG. 4 functions in several ways to acquire words that are gathered into CRM events for parsing and inference. In a first alternative way of providing a digitized word (509) to the parsing engine (298), the dashboard through a speech engine (153) recognizes words into digitized speech from a conversation between a tele-agent (128) and a customer representative (129). In this example method, recognizing speech from such a conversation is carried out as follows. Words of speech from the conversation (313) travel through a microphone (176) and amplifier of the computer (152) and, in a thin-client architecture, through a VOIP connection to a voice server (151)

where a speech recognition engine recognizes the words into a stream of digitized speech which is handed off to a natural language processing engine which processes the digitized speech into sentences and parts of speech and passes the words so processed (509) to the parsing engine (298) where they are parsed into triples (752). This is a first alternative way in which the dashboard provides words for inclusion in CRM events.

In a second alternative way of providing a digitized word to the parsing engine, the dashboard gathers into a CRM event a word of call notes from a text box widget (366). The tele-agent, rather than speaking words for a CRM event, types call notes into a text box widget (366), and the text so typed is provided by the dashboard as digitized words in a CRM event to a natural language processing engine (155). The natural language processing engine sees no difference between typed words from the text box (366) and the words in a stream of digitized speech from a spoken conversation. Thus, this second alternative is similar to the first alternative with the exception that there is no need for speech recognition, because when a stream of digitized text in CRM events arrives in the speech engine (153), the words in the stream are already digitized by typing in through the text box (366). The natural language processing engine (155) works the same way as in the first alternative, processing the digitized text from the text box (366) into sentences and parts of speech and passing the words so processed (509) to the parsing engine (298) where they are parsed into triples (752). This is a second alternative way in which the dashboard provides words for inclusion in CRM events.

In a third alternative way of providing a digitized word to the parsing engine, the dashboard passes to the parsing engine words designated as elements of triples through widgets (360, 362, 364) of the dashboard. These widgets are pull-down menu listings of Subjects for triples (360), Predicates for triples (362), and Objects (364) for triples. The Predicates (362) and Objects (364) usually are triple elements already defined in an ontology supportive of a semantic CRM triple store portion of an enterprise knowledge graph. The Subjects (360) are a stream of word candidates for inclusion in triples. Words in the Subjects pull-down menu (360) are provided by the speech engine (153) from call notes text (366) or from words recognized from a conversation (313) or otherwise. The tele-agent (128) designates a word (509) for inclusion in a CRM event by selecting a word from the Subjects pull-down menu (360), for example, selecting by keyboard or mouse (181). The tele-agent can select a word from the pull-down (360) by double-click or by drag-and-drop onto the assembly box (368) for triples. The tele-agent can optionally also select a Predicate (362) or an Object (364) for inclusion in the same triple with the selected Subject, also by double-click or drag-and-drop. The tele-agent's selections of predicates and objects in some embodiments can be binding upon the parsing engine. In other embodiments, the tele-agent's selections are treated by the parsing engine merely as recommendations. The parsing engine (298) optionally accepts the tele-agent's selections of predicates and objects, or the parsing process makes its own selections of predicates and triples for inclusion with a word in at least one parsed triple (752). This is a third alternative way in which the dashboard provides words for inclusion in CRM events.

Figure 5:
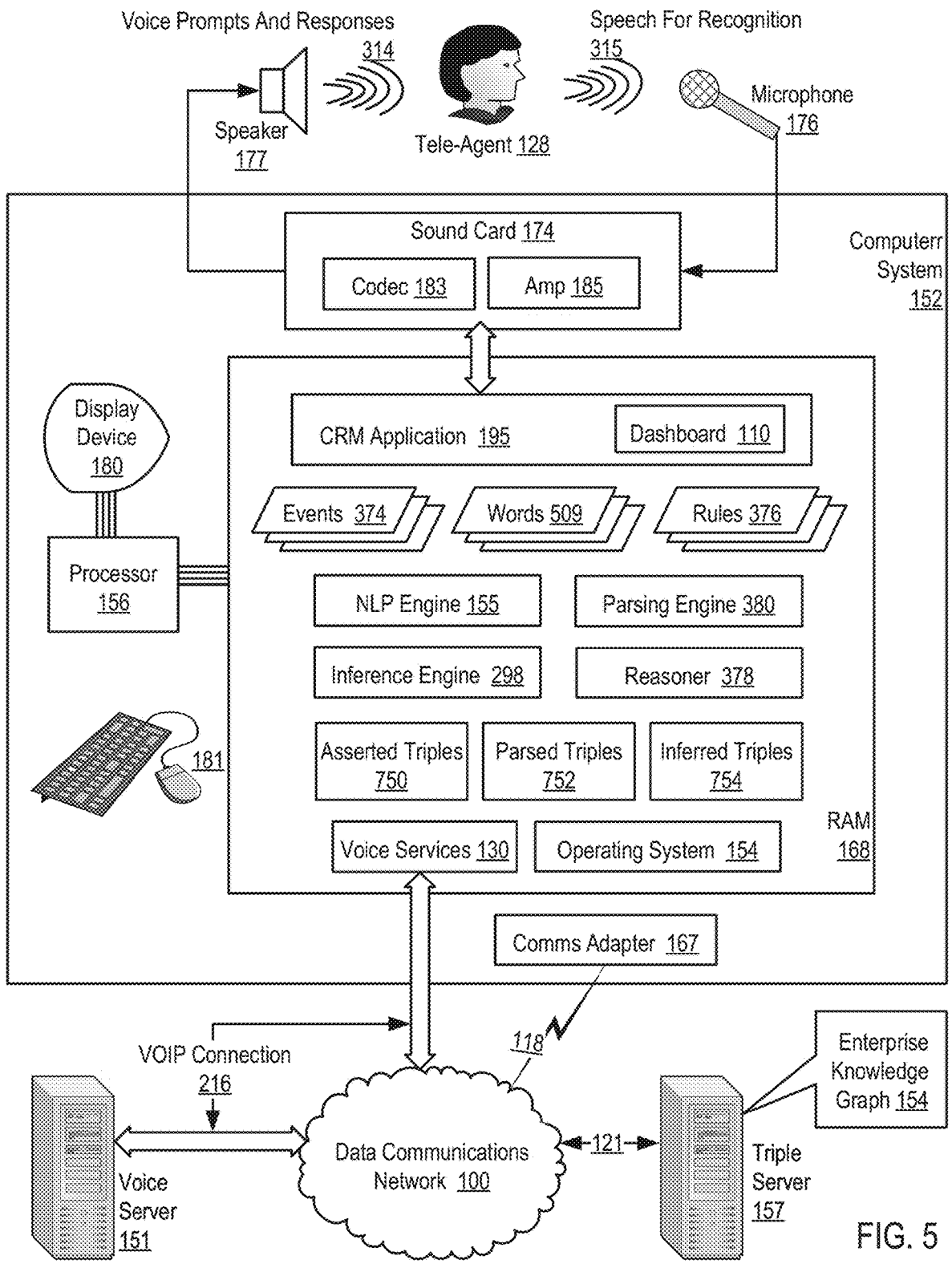
FIG. 5 sets forth a functional block diagram of example apparatus for CRM in a thin-client architecture according to embodiments of the present invention.

For further explanation, FIG. 5 sets forth a functional block diagram of example apparatus for CRM in a thin-client architecture according to embodiments of the present invention. A thin-client architecture is a client-server architecture in which at least some of, in some embodiments most of, in some embodiments all of, speech processing and triple processing is off-loaded from the client to servers. Thinness of a thin-client varies. The computer (152) in the example of FIG. 5 is a thin client in which most speech processing is off-loaded to a voice server (151). The computer (152) accepts voice input (315, 174), but then transfers the voice input through a VOIP connection (216) to the voice server (151) where all speech processing is performed. The speech-enabled device in this example does implement some capacity for triple processing (155, 380, 298), but most of that is optional architecture in a thin client. Devices with reduced storage capacity, a smartwatch or a mobile phone for example, can be implemented with no natural language processing engine (155), no parsing engine (380), and no inference engine (298), merely passing CRM events through to a triple server (157) that itself carries out all parsing and inferencing.

In the particular example of FIG. 5, the computer (152) occupies a middle ground of thin-client architecture. It supports little or no speech processing, but it does support some triple processing. The thin-client computer in this example performs parsing and inferencing only against triple stores (750, 752, 754) in RAM (168), leaving large-scale storage to the triple server (157). The semantic reasoner (378) loads from storage on the triple server (157) asserted triples (750) as needed to support inferences. This is a compromise between an extremely thin client with no triple storage at all and the thick client described below with regard to FIG. 9.

The example apparatus of FIG. 5 includes the computer (152) and a voice server (151) connected for data communication by a VOIP connection (216) through a data communications network (100). A dashboard (110) runs on the speech-enabled device (152), and in this example, the dashboard (110) is a speech-enabled application that operates user I/O by voice (315), by GUI on a display (180), by keyboard and mouse (181), and so on. A CRM application operates the dashboard as a user interface, and the CRM application may be implemented as a set or sequence of X+V or SALT documents that execute on a speech-enabled browser, a Java Voice application that executes on a Java Virtual Machine, or a speech-enabled application implemented in other technologies as may occur to those of skill in the art. The example computer of FIG. 5 includes a sound card (174), which is an example of an I/O adapter specially designed for accepting analog audio signals from a microphone (176) and converting the audio analog signals to digital form for further processing by a codec (183).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols may be used to effect VOIP, including, for example, types of VOIP effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The CRM application (195) in this example is a user-level, speech-enabled, client-side computer program that presents a voice interface to user (128), provides audio prompts and responses (314) and accepts input speech for recognition (315). The CRM application (195) provides a speech interface through which a user may provide oral speech for recognition through microphone (176) and have the speech digitized through an audio amplifier (185) and a coder/decoder ('codec') (183) of a sound card (174) and provided for recognition to a voice server (151). Speech-enabled application (195) packages digitized speech in recognition request messages according to a VOIP protocol, and transmits the speech to voice server (151) through the VOIP connection (216) on the network (100).

The voice server (151) provides voice recognition services for speech-enabled devices by accepting dialog instructions, VoiceXML segments, or the like, and returning speech recognition results, including text representing recognized speech, text for use as variable values in dialogs, and output from execution of semantic interpretation scripts as well as voice prompts. Voice server (151) includes computer programs that provide text-to-speech ('TTS') conversion for voice prompts and voice responses to user input in speech-enabled applications such as, for example, X+V applications, SALT applications, or Java Speech applications.

The computer (152) in the example of FIG. 5 includes a semantic query and inference engine (298), a module of automated computing machinery that accepts from the CRM application (195) and the dashboard (110) and executes against parsed triples (752) semantic queries and inferences according to semantic rules of inference (376). In this paper, the query and inference engine is often called, for ease of reference, merely an inference engine. But the longer name is appropriate in a way, because instructions for inference in many embodiments, particularly those that implement RDF/RDGS/OWL ontologies for triples and SPARQL for queries, are expressed as components of SPARGL queries, and in such embodiments, inference rules (376) can be, and often are, expressed as elements of semantic queries. In such embodiments, the CRM application (195) formulates semantic queries with user input through the dashboard from speech (315), GUI (110), keyboard or mouse (181), or the like. Such a semantic query is a query designed and implemented against structured data. Semantic queries utilize logical operators, namespaces, pattern matching, subclassing, transitive relations, semantic rules and contextual full text search. Semantic queries work on named graphs, linked-data, or triples. In embodiments of the present invention, linked triples typically form graphs. Data so structured enables a semantic query to process actual relationships between items of information and infer answers from a structured network of data. Semantic queries contrast with semantic search, which attempts with various levels of success to use semantics in unstructured text to improve meaning of search results.

Example formulations of semantic queries are had in C, C++, Java, Prolog, Lisp, and so on. The semantic web technology stack of the W3C is an example formulation that offers SPARQL to effect semantic queries in a syntax similar to SQL. Semantic queries are used against data structured in triple stores, graph databases, semantic wikis, natural language, and artificial intelligence systems. As mentioned, semantic queries work on structured data, and in the particular examples of the present case, the structured data is words described and defined in semantic triples connected in ways that conform to a formal logic, sometimes a predicate logic, often a description logic. In many embodiments of the present invention, semantic queries are asserted against data structured according to a description logic that implements decidability.

In the example apparatus of FIG. 5, the computer (152) is coupled for data communication through a communications adapter (167), wireless connection (118), data communications network (100), and wireline connection (121) to a triple server (157). The triple server (157) provides large volume backup for triple stores. The triple server is a configuration of automated computing machinery that serializes triples and stores serialized triples in relational databases, tables, files, or the like. The triple server retrieves as needed from non-volatile storage such serialized triples, parses the serialized triples into triple subgraphs, and provides such triple subgraphs upon request to thin-client computers and other devices for use in systems that utilize the triples in CRM according to embodiments of the present invention.

Effecting CRM with semantic triples according to embodiments of the present invention, particularly in a thin-client architecture, may be implemented with one or more voice servers. A voice server is a computer, that is, automated computing machinery, that provides speech recognition and speech synthesis. For further explanation, FIG. 6 sets forth a block diagram of automated computing machinery comprising an example of a computer useful as a voice server (151) supportive of CRM with a client computer according to embodiments of the present invention. The voice server (151) of FIG. 6 includes at least one computer processor (156) or 'CPU' as well as random access memory (168) ('RAM') which is connected through a high-speed memory bus (166) and bus adapter (158) to the CPU (156) and to other components of the voice server.

Stored in RAM (168) is a voice server application (188), a module of automation capable of operating a voice server in a system that is configured for use in CRM according to embodiments of the present invention. Voice server application (188) provides voice recognition services for speech-enabled client devices by accepting requests for speech recognition and returning speech recognition results, including text representing recognized speech, text for use as variable values in dialogs, and text as string representations of scripts for semantic interpretation. Voice server application (188) also includes the capability to provide text-to-speech ('TTS') conversion for voice prompts and voice responses to user input in speech-enabled client-side applications such as, for example, speech-enabled browsers, X+V applications, SALT applications, Java Speech applications, and so on.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. And voice server applications that support embodiments of the present invention may be implemented in other ways as may occur to those of skill in the art, and all such ways are well within the scope of the present invention.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (155). The NLP engine accepts recognized speech from an automated speech recognition ('ASR') engine, processes the recognized speech into parts of speech, subjects, predicates, objects, and so on, and then makes such parts available to parsing engines for conversion into semantic triples for further inference and for inclusion in triple stores.

The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar (104) communicates to the ASR engine (150) the words and sequences of words that currently may be recognized. For further explanation, distinguish the purpose of the grammar and the purpose of the lexicon. The lexicon associates with phonemes all the words that the ASR engine can recognize. The grammar communicates the words currently eligible for recognition. The two sets at any particular time typically are not the same.

Grammars may be expressed in a number of formats supported by ASR engines, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
  #JSGF V1.0;
  grammar command;
  <command> = [remind me to] call | phone | telephone <name>
<when>;
```

-continued

```
  <name> = bob | martha | joe | pete | chris | john | artoush;
  <when> = today | this afternoon | tomorrow | next week;
  ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these:

"phone bob next week,"
"telephone martha this afternoon,"
"remind me to call chris tomorrow," and
"remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application like a client-side CRM application (195 on FIG. 5) or a dashboard (110 on FIG. 5) in a thin-client architecture may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a speech-enabled application.

As mentioned above, a Form Interpretation Algorithm ('FIA') drives the interaction between a user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 6 are shown in RAM (168), but many components of such software typically are stored in non-volatile memory also, for example, on a disk drive (170).

Figure 6:
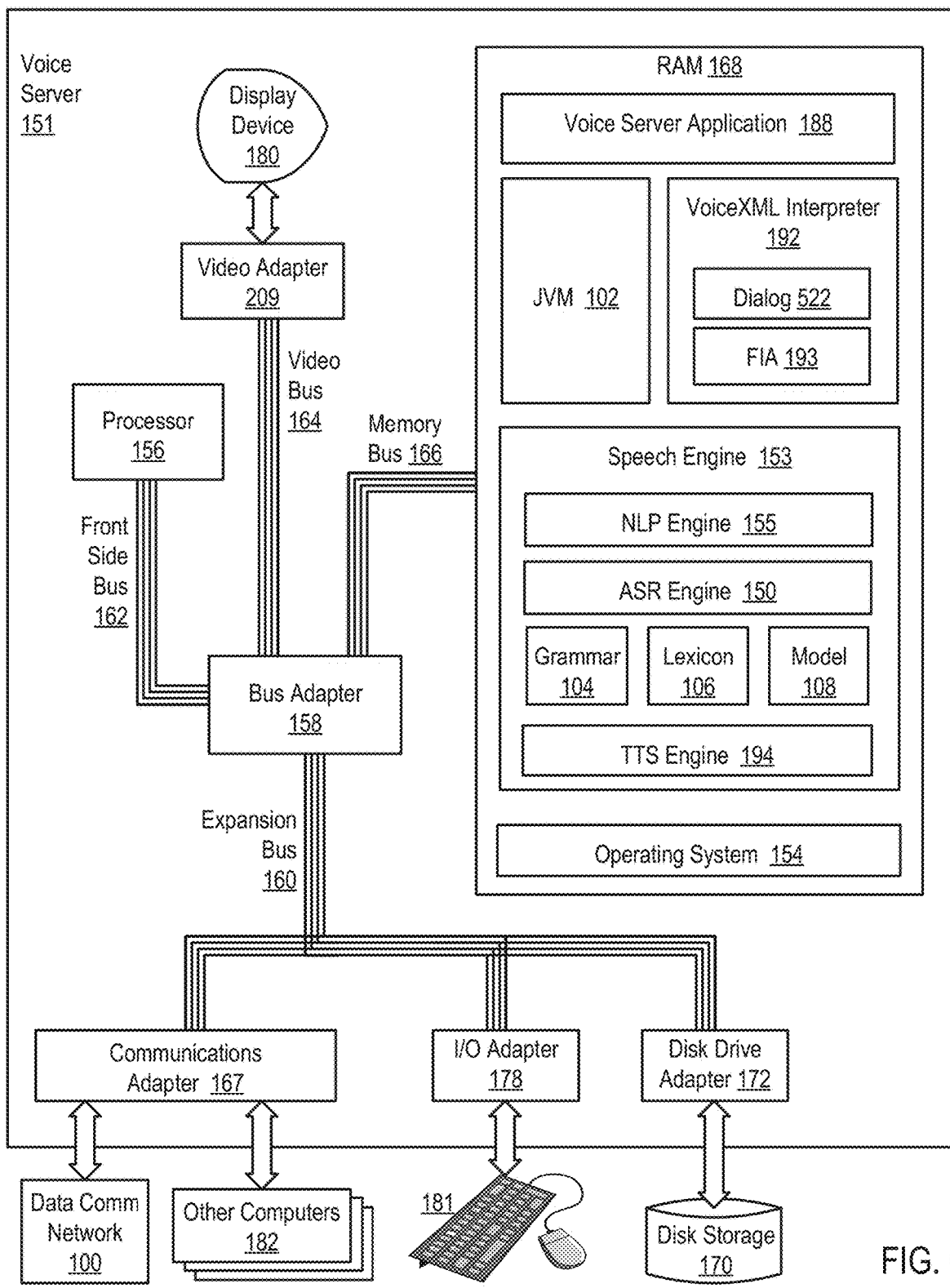
FIG. 6 sets forth a block diagram of an example computer useful as a voice server for CRM according to embodiments of the present invention.

Voice server (151) of FIG. 6 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 6 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 6 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 6 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 6 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Figure 7:
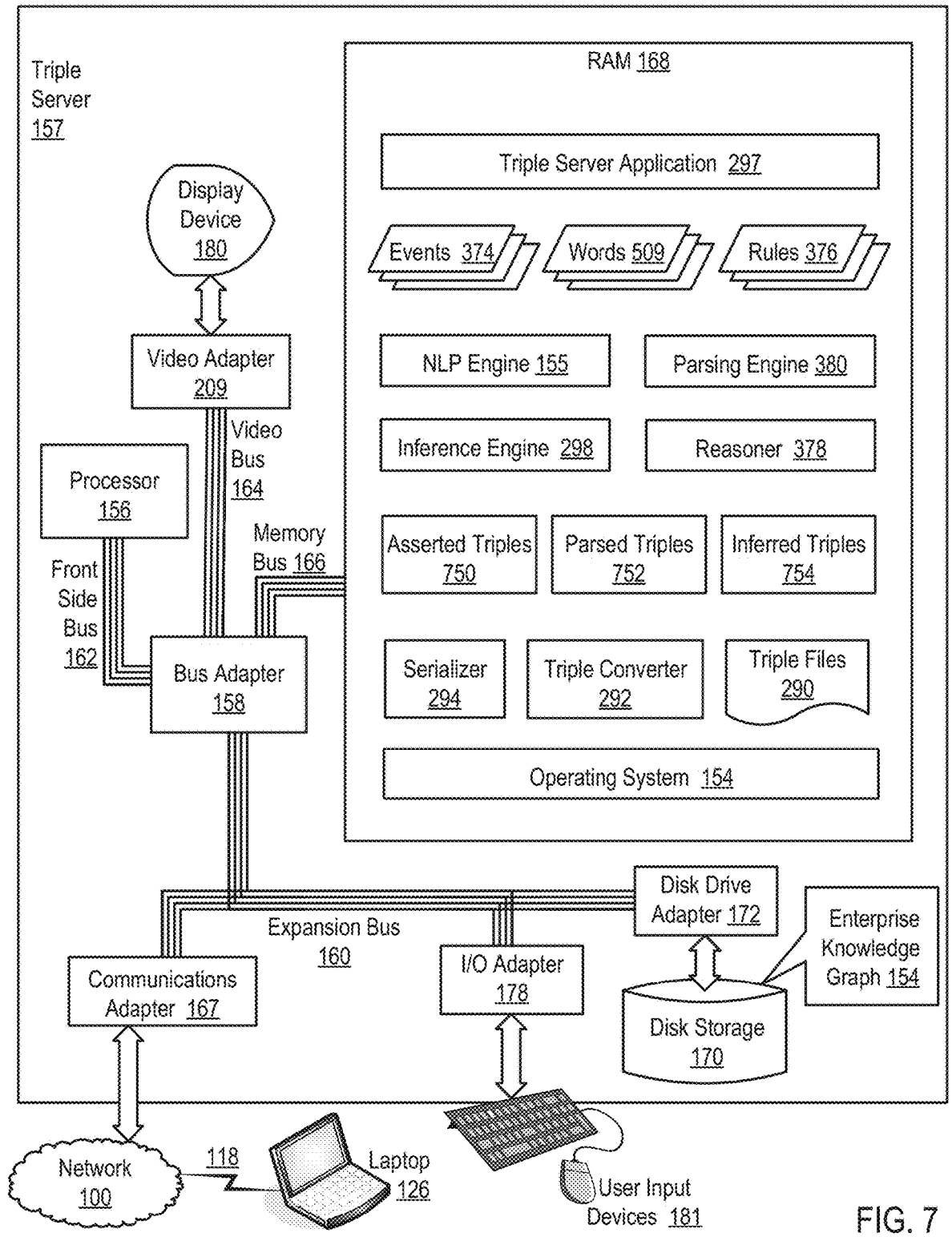
FIG. 7 sets forth a block diagram of an example computer useful as a triple server for CRM according to embodiments of the present invention.

For further explanation, FIG. 7 sets forth a block diagram of automated computing machinery comprising an example of a computer useful as a triple server (157) for CRM according to embodiments of the present invention. The triple server (157) of FIG. 7 includes at least one computer processor (156) or 'CPU' as well as random access memory (168) ('RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), CRM events (374) generated by a CRM application running on the laptop (126) and provided across the network (100) to the triple server, words (509) from the events to be parsed into triples, inference rules (376), a natural language processing ("NLP") engine (155), a parsing engine (380), an inference engine (298), and a semantic reasoner (378). Also disposed in RAM are a triple serializer (294), a triple converter (292), and one or more triple files (290). The triple server application program (297) accepts, through network (100) from speech-enabled devices such as laptop (126), CRM events (374) from which it extracts words for parsing (509). The NLP engine optionally eases the parsing process by first processing the words into sentences and parts of speech before providing the words so processed to the parsing engine. The parsing engine parses the words into parsed triples (752). The inference engine (298) takes as inputs the parsed triples (752) and the inference rules (376) and infers inferred triples (754). If, given only the parsed triples, there is an insufficient quantity of inference output from the inference engine on a first pass, then the semantic reasoner (378) optionally retrieves from an enterprise knowledge graph (154) a pertinent subgraph of previously asserted triples (750), joins the asserted triples with the parsed triples, and instructs the parsing engine to parse again, this time against the join, subject to the same inference rules (376). The semantic reasoner, in retrieving the pertinent subgraph of asserted triples, retrieves a subgraph having a same CRM type as the CRM event (374) whose words (509) are currently being processed.

The serializer (294) administers the transfer of triples between triple stores (750, 752, 754) in RAM and various forms of disk storage or other non-volatile storage. The serializer (294) accepts as inputs the contents of triple stores and serializes them for output as triple files (290), tables, relational database records, spreadsheets, text documents, or the like, for long-term storage in non-volatile memory, such as, for example, on a hard disk (170). The serializer (294) accepts triple files (290) as inputs and outputs parsed triples into triple stores in RAM. In many embodiments, when the serializer (294) accepts triple files (290) as inputs and outputs parsed triples into triple stores in RAM, the serializer stores the output triple stores into contiguous segments of memory. Contiguous storage can be effected in the C programming language by a call to the malloc( ) function. Contiguous storage can be effected by the Python buffer protocol. Contiguous storage can be effected in other ways as will occur to those of skill in the art, and all such ways are within the scope of the present invention. In many embodiments, triple stores (750, 752, and 754) would be stored in segments of contiguous memory.

Figure 8:
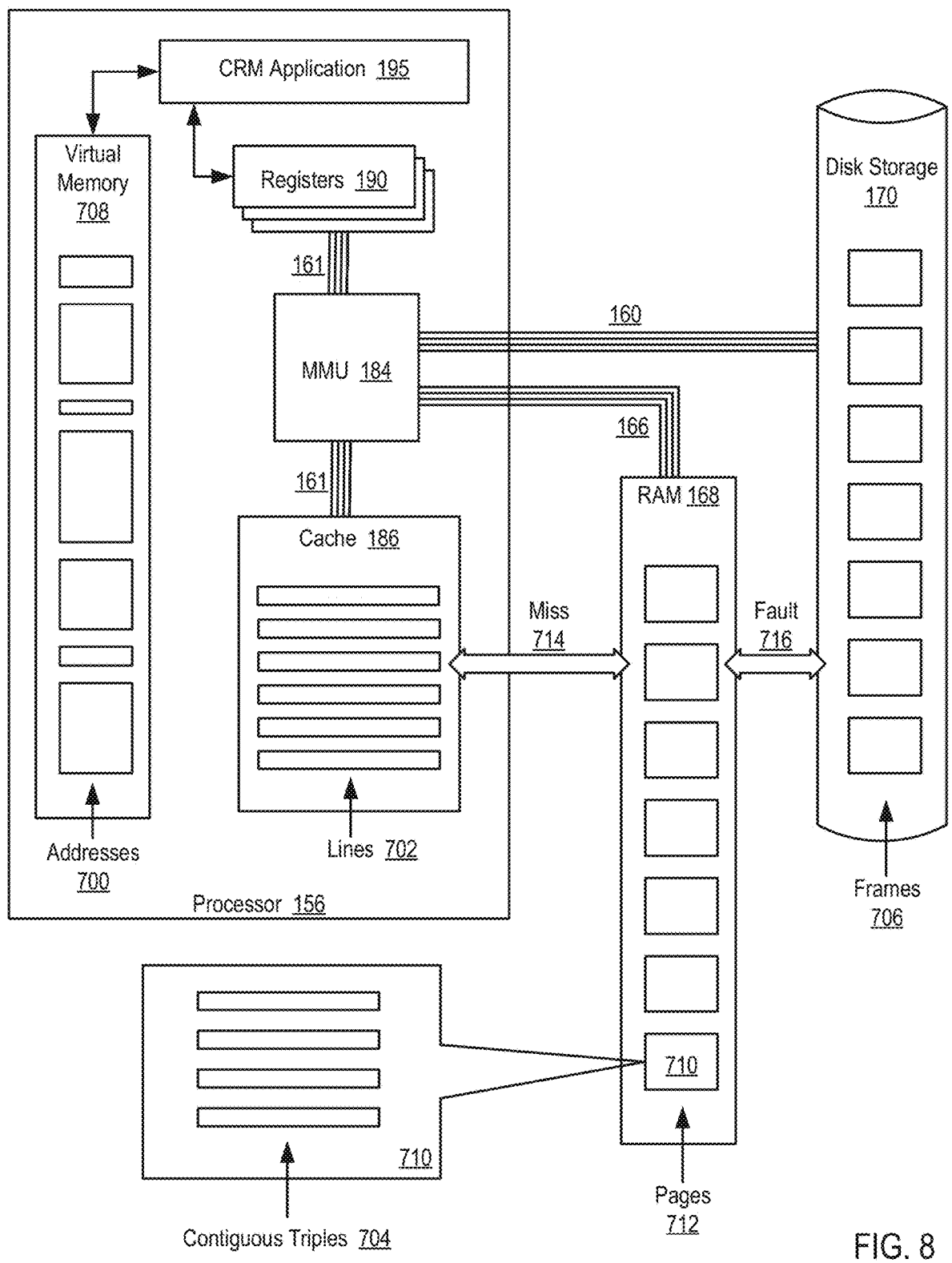
FIG. 8 sets forth a block diagram of an example computer memory system useful for CRM according to embodiments of the present invention.

Contiguous memory is explained in more detail with reference to FIG. 8. FIG. 8 sets forth a block diagram of a computer memory system, configured supportive of CRM according to embodiments, that includes a computer processor (156) composed of various registers (190) executing a CRM application program (195). The CRM application and the registers of the processor operate with memory addresses (700) disposed in virtual memory (708). The contents of virtual memory are backed up with physical storage in an on-processor cache (186), RAM (168), and disk (170). The contents of the cache are organized in cache lines (702). Memory in RAM is organized in pages (712). Memory on disk is organized in frames (706). A memory management unit ("MMU") (184) translates virtual memory addresses into physical memory locations and moves contents of memory from physical storage to and from processor registers. In accessing physical memory, the MMU always looks first in the cache. A failure to find content in the cache is termed a "cache miss" (714). Upon a cache miss, the MMU seeks memory content in RAM (168) and moves it into the cache. Failing to find sought content in RAM, a failure termed a "page fault" (716), the MMU looks all the way out to the page frames (706) on disk, moves content into RAM (168) and then into cache (186).

Here is the challenge addressed by the use of contiguous memory. In typical embodiments, cache access takes 10 nanoseconds. RAM access takes 100 nanoseconds. Disk access takes 10,000,000 nanoseconds. Those numbers are not intuitive. People don't experience time in nanoseconds. Look at it in more familiar terms. If cache access is viewed as taking one minute, then RAM access takes 10 minutes, and disk access for the same data takes two years. Triples scattered across virtual memory addresses risk being stored in multiple page frames. Triples stored near one another in a contiguous memory segment are much more likely to be stored in a small number of page frames.

Suppose a set of parsed triples, inferred triples, or asserted triples is composed of 10 kilobytes of storage. Some computer systems today support memory page sizes of a megabyte or more. Such a set of triples (704) can be stored in a single memory page (710), and, once that page is in RAM (168), operation of the triple set for CRM can proceed with no risk of page faults at all. Even if contiguous storage for such a set falls across a page boundary, the entire set of triples can still be loaded with only two page faults, and, after it is loaded into RAM, it can be operated with zero page faults going forward. Cache misses would still be required to load the contents into cache, but, except for the first one or two misses, none of the others would risk a page fault. The inventors estimate that after a short period of operation, the cache miss rate would be less than one percent for operation of such a set of triples in the context of CRM. That is, when a set of triples is disposed in contiguous memory in support of CRM according to embodiments of the present invention, memory access times generally will approximate cache access times, just a few nanoseconds, for more than 99% of memory access.

Figure 9:
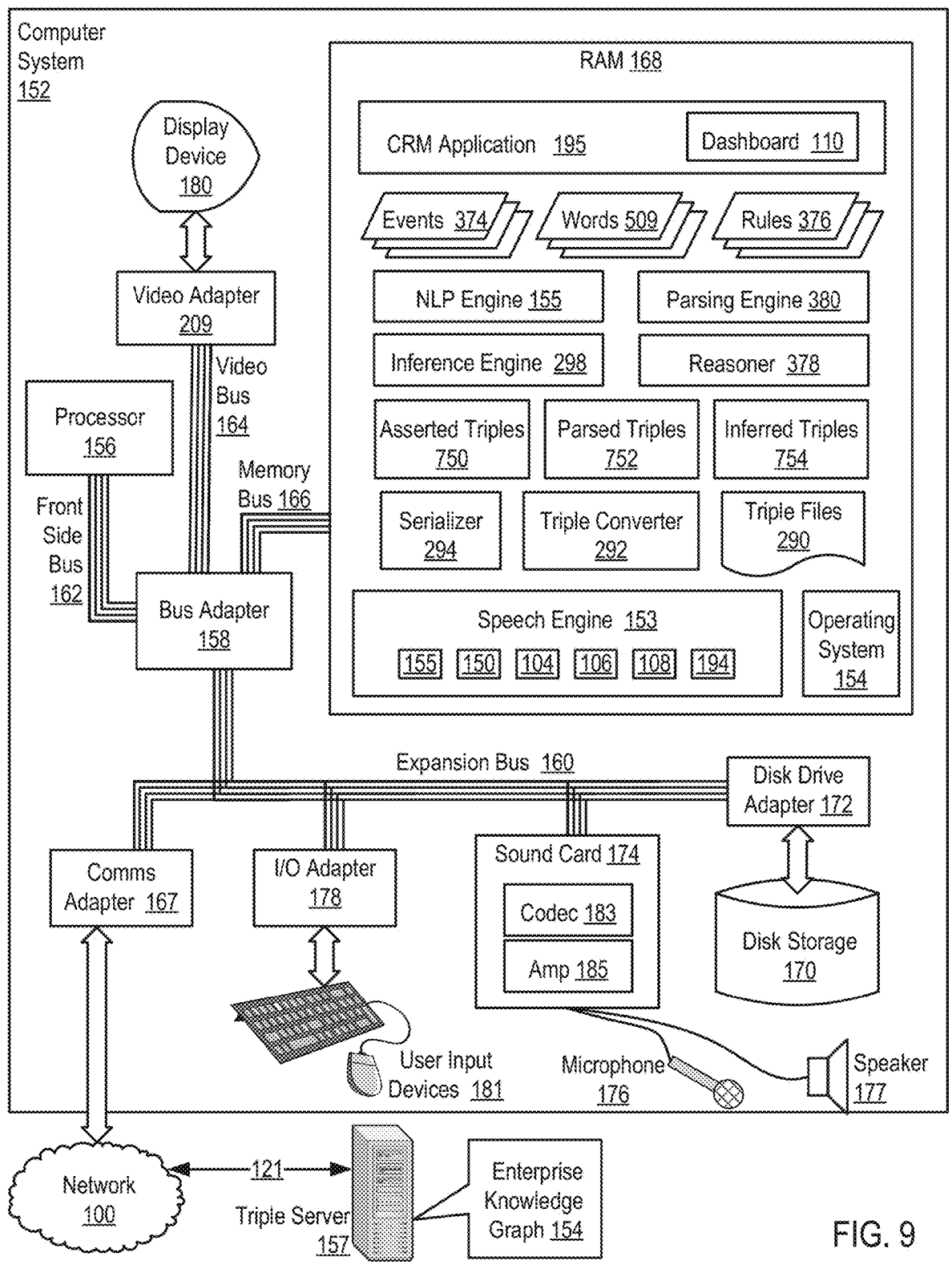
FIG. 9 sets forth a functional block diagram of example apparatus for CRM in a thick-client architecture according to embodiments of the present invention.

For further explanation, FIG. 9 sets forth a functional block diagram of example apparatus, a speech-enabled device for CRM, in a thick-client architecture according to embodiments of the present invention. A thick-client architecture is a client-server architecture in which all or most of the functionality required to administer CRM with semantic triples is supported directly on client-side devices rather than on servers. Servers are used for backup and synchronization rather than speech recognition, semantic queries, or inferencing. A thick client requires resources, processor power and memory storage, possibly not always available on a small device such as a smartwatch or a mobile phone. In a thick client with sufficient data processing resources, however, all pertinent functionality, CRM events, inference rules, parsing, inferencing, triple stores, speech, and so on, typically are immediately and fully useful, regardless of network availability. The thick-client speech-enabled computer (152) in the example of FIG. 9 is automated computer machinery that includes a CPU (156), RAM (168), data buses (162, 164, 166, 160), video (180, 209), data communications (167), I/O (178), and disk storage (170).

Disposed in RAM are a CRM application program (195) that exposes and operates a GUI dashboard (110), CRM events (374) generated by the CRM application running on the computer (152) and, provided through the CRM events, words (509) from the events to be parsed into triples (752), inference rules (376), a natural language processing ("NLP") engine (155), a parsing engine (380), an inference engine (298), and a semantic reasoner (378). Also disposed in RAM are a triple serializer (294), a triple converter (292), and one or more triple files (290). The NLP engine optionally eases the parsing process by first processing the words (509) into sentences and parts of speech before providing the words so processed to the parsing engine. The parsing engine parses the words into parsed triples (752). The inference engine (298) takes as inputs the parsed triples (752) and the inference rules (376) and infers inferred triples (754). If, given only the parsed triples, there is an insufficient quantity of inference output from the inference engine on a first pass, then the semantic reasoner (378) optionally retrieves from an enterprise knowledge graph (154) a pertinent subgraph of previously asserted triples (750), joins the asserted triples with the parsed triples, and instructs the parsing engine to parse again, this time against the join, subject to the same inference rules (376). The semantic reasoner, in retrieving the pertinent subgraph of asserted triples, retrieves a subgraph having a same CRM type as the CRM event (374) whose words (509) are currently being processed.

The serializer (294) administers the transfer of triples between triple stores (750, 752, 754) in RAM and various forms of disk storage or other non-volatile storage. The serializer (294) accepts as inputs the contents of triple stores and serializes them for output as triple files (290), tables, relational database records, spreadsheets, text documents, or the like, for long-term storage in non-volatile memory, such as, for example, on a hard disk (170). The serializer (294) accepts triple files (290) as inputs and outputs parsed triples into triple stores in RAM. In many embodiments, when the serializer (294) accepts triple files (290) as inputs and outputs parsed triples into triple stores in RAM, the serializer stores the output triple stores into contiguous segments of memory. Contiguous storage can be effected in the C programming language by a call to the malloc( ) function. Contiguous storage can be effected by the Python buffer protocol. Contiguous storage can be effected in other ways as will occur to those of skill in the art, and all such ways are within the scope of the present invention. In many embodiments, triple stores (750, 752, and 754) would be stored in segments of contiguous memory.

The speech-engine (153) is a full-service NLP-SR engine that includes natural language processing (155), speech recognition (150), a grammar (104), a lexicon (106), a model (108), and text-to-speech processing (194), all as described in more detail above with regard to FIG. 6. The thick-client speech-enabled device (152) has no need to reach across a network for speech-related processing. Full speech enablement is available directly on the thick client computer itself.

Figure 10:
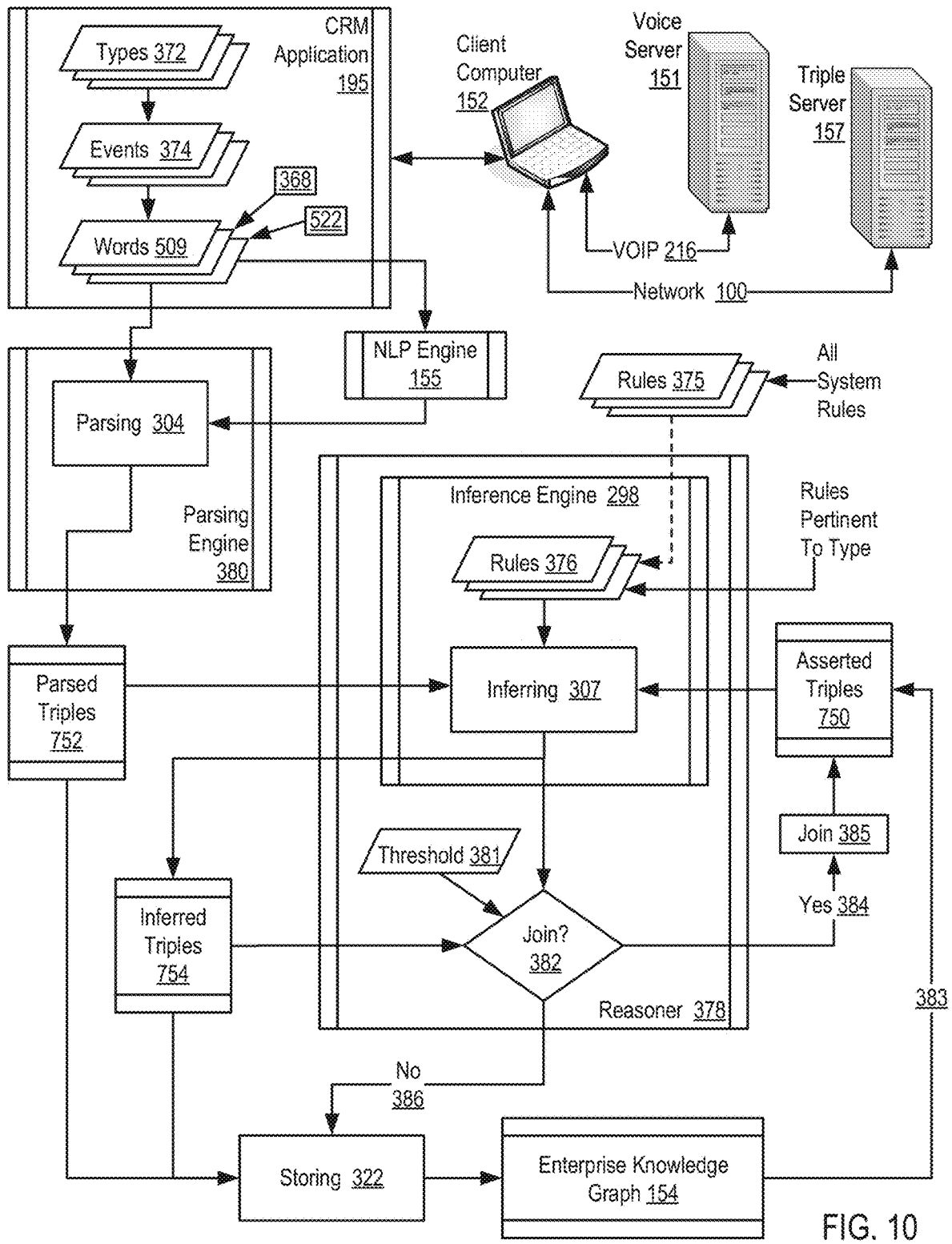
FIG. 10 sets forth a flow chart illustrating an example method of CRM according to embodiments of the present invention.

For further explanation, FIG. 10 sets forth a flow chart illustrating an example method of CRM according to embodiments of the present invention. The functions of the method of FIG. 10 are implemented with or disposed upon some combination of a client computer (152), a voice server (151), and a triple server (157). That is, for example, a speech engine can be disposed upon the voice server (151) in a thin-client architecture or upon the client (152) in a thick-client architecture. And parsing and inference can be carried out either on a triple server (157) or on a client computer (152). The question exactly where any particular function occurs therefore depends upon the architecture—although all such elements are computers—and they are all configured together, in one architecture or another, to carry out CRM according to embodiments.

The method of FIG. 10 includes parsing (304) words (509) into parsed triples (752), inferring (307) inferred triples (754) with inference rules (3767) applied to the parsed triples (752), and storing (322) the parsed triples (752) and the inferred triples (754) in an enterprise knowledge graph (154) for use in CRM. The words (509) are words of CRM events (374) from a CRM application running on a client computer (152). The CRM events are said to present in a stream because they present serially in time, one after another. Each CRM event is characterized by a CRM event type (372), that is, a type code, such as, for example, customer-related, customer-representative-related, user-defined-through-GUI, user-defined-through-voice, call-note-event, and so on, and so on. The words (509) are grouped by CRM event (374) and also therefore characterized by that event's type code (372). Each group of words is parsed into a group of parsed triples (752) that continues to be characterized by the type code. And the inference engine (298) then selects inference rules (376) according to the type code, allowing the inference process (307) to operate for each group of parsed triples with a subset of inference rules pertinent to type, rather than applying all system inference rules (375) to all parsed triples.

The parsing process (304) functions by forming words (509) into semantic triples (752). The parsing process (304) functions by forming into semantic triples (752) words designated through GUI widgets (368) as element of triples, subject, predicate, object. The parsing process (304) functions by forming into semantic triples (752) words designated through voice commands in a VoiceXML dialog (522) as elements of triples, subject, predicate, object. The parsing process (304) functions by forming into semantic triples (752) words designated by a natural language processing engine (155) as parts of speech, subject, predicate, object. The parsing process hands off the parsed triples (752) to the inference engine (298) and the storage function (322) for further processing. In many embodiments, the parsing process hands off the parsed triples (752) to the inference engine (298) and the storage function (322) by disposing the parsed triples in a segment of contiguous memory and providing a memory address to the inference engine (298) and the storage function (322).

Some embodiments exclude the join decision (382). Such embodiments pass the parsed triples (752) and the inferred triples (754), if there are any inferred triples, directly to storage (322) in a knowledge graph (154). Such embodiments balance a tradeoff between present speed of data processing and a later burden of inference against the knowledge graph as a whole.

The example method of FIG. 10, however, includes a decision (382) by a semantic reasoner (378) whether to join the parsed triples (752) with a subgraph of previously asserted triples (750) from the larger knowledge graph (154). The join decision (382) compares the number of inferred triples (754) with a predefined threshold value (381), and the reasoner (378) carries out the join (385) if the number of inferred triples is less than the threshold value. That is, the semantic reasoner (378) retrieves from the enterprise knowledge graph (154) a pertinent subgraph of previously asserted triples (750), joins the asserted triples with the parsed triples (752), and instructs the parsing engine (298) to parse again, this time against the join, subject to the same inference rules (376). The semantic reasoner, in retrieving the pertinent subgraph of asserted triples, retrieves a subgraph having a same CRM type as the CRM event (374) whose words (509) are currently being processed.

For explanation, consider the case when the number of triples inferred from a set of parsed triples is zero. The method of FIG. 10 believes that the number of triples inferred from the parsed triples will be greater than zero when the parsed triples are combined with the enterprise knowledge graph and inference is run against the entire knowledge graph. Inference against the entire knowledge graph, however, is a burdensome process. One purpose or benefit of running inference against the smaller set of triples parsed from words of an event is to reduce the burden of inference against an entire enterprise knowledge graph.

The method of FIG. 10 therefore presents a compromise between inference only against parsed triples from a single CRM event and inference over an entire enterprise knowledge graph. The compromise is to join (385) parsed triples (752) with a portion of the knowledge graph, a subgraph of previously asserted triples (750), and run inference (307) against the triples so joined, using the same rules of inference (376). This compromise supports a lesser burden of inference against less than the entire enterprise knowledge graph. In addition, by selecting a subgraph pertinent to the CRM event type from which the parsed triples are derived, the method of FIG. 10 intends to infer triples that would be inferred anyway later when inference would be run against the entire enterprise knowledge graph.

The decision to join (385), by comparison with excluding the decision to join, is a data processing event more burdensome than not joining but less burdensome than inference against an entire enterprise knowledge graph. The decision to join therefore might be compared to a cache miss or a page fault in memory management, but the decision here can be parameterized with a threshold value. The most obvious threshold value is 'one,' when asserted triples are joined only if there are no inferred triples from a first inference against parsed triples. This is the case when it is most likely that joining a pertinent subgraph will result in production of inferred triples. As the threshold increases, the likelihood that joining asserted triples will result in a meaningful number of additional inferred triples is reduced. And the higher the threshold value, the more likely it is that joins will occur. The threshold value therefore is an operating parameter to be set according to experience with the system over time.

Figure 11:
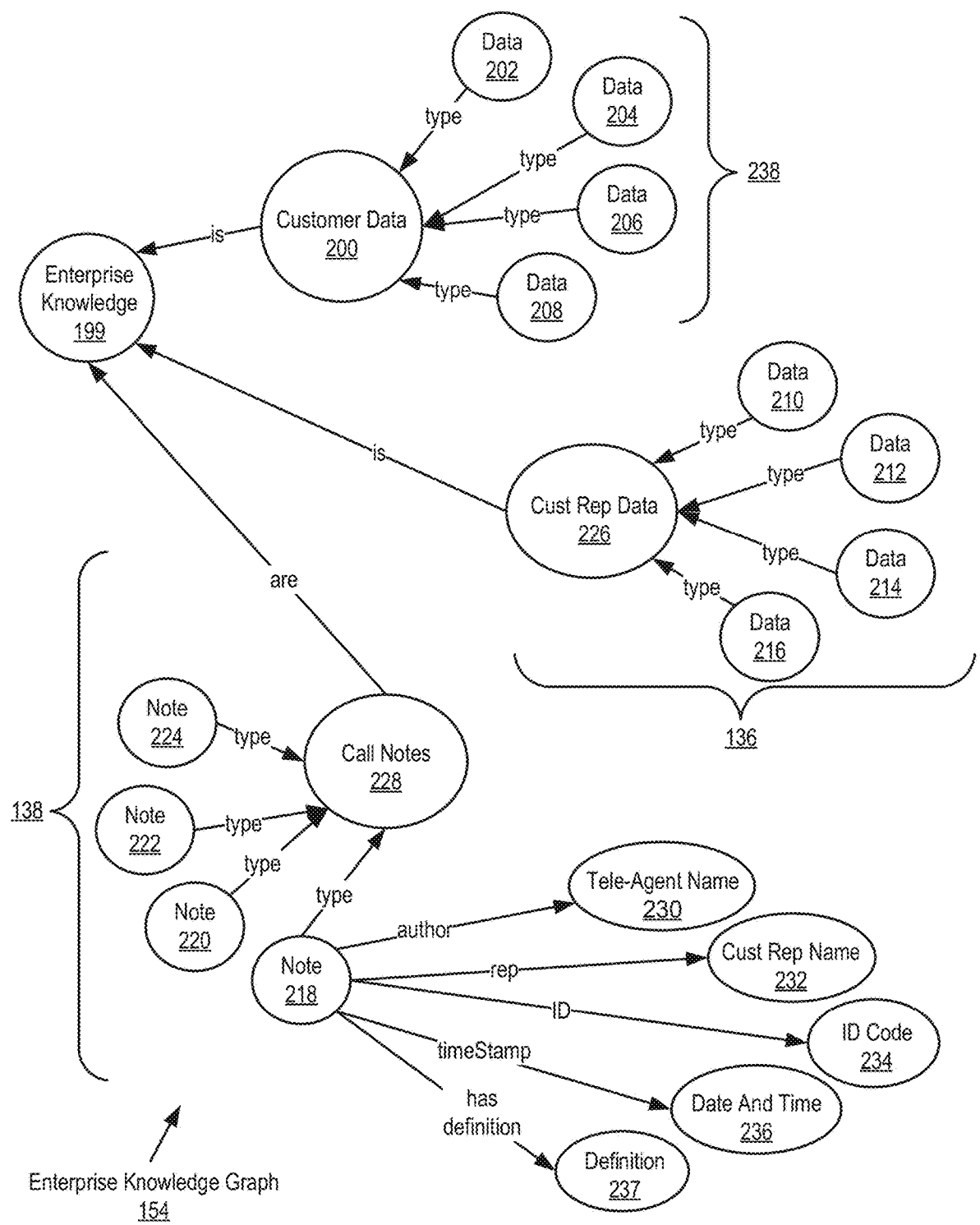
FIG. 11 sets forth an example enterprise knowledge graph in which triples regarding customers, customer representatives, and call notes are implemented as subgraphs.

For further explanation, FIG. 11 sets forth an example enterprise knowledge graph (154) in which type-coded subgraphs are implemented as logically-connected segments of the overall knowledge graph. All the nodes and edges in the example graph (154) of FIG. 11 are elements of semantic triples. The example graph (154) includes subgraphs type-coded as customer information (238), customer representative information (136), and call notes (138). These three subgraphs are merely examples, not limitations of enterprise knowledge graphs. Enterprise knowledge graphs also will typically include financials, vendor information, business entities and structures, project information, corporate guidelines and manuals, employee data, incorporation data, transactions, contracts, sales histories, research details, and so on, and so on, and so on.

The root of the graph (154) is a class object named Enterprise Knowledge (199). The nodes Customer Data (200), Cust Rep Data (226), and Call Notes (228) are subclasses of Enterprise Knowledge. The individual call note nodes (218, 220, 222, 224) each contains at least one word from a tele-agent conversation that has been parsed into a semantic triple, or it should be said, parsed into at least one semantic triple. The example of FIG. 11 also illustrates the fact that the parsing process can and will often result in multiple triples for each word that is parsed or inferred into semantic triples. Call note (218), for example, is a subject of six triples in this example: one triple designates that subject (218) is type-coded as a call note (228), one provides the name (218) of the tele-agent who authored the call note, one records the name (232) of the customer representative whose conversation generated the call note, one records an identification code (234) for the call note, one provides a time stamp (236) for the call note, and one provides a definition (237) for at least one of the words in the call note.

Queries against a triple store in a graph like graph (154), such as, for example, queries used by semantic reasoners to extract a subgraph of asserted triples to join with parsed triples, can include a clause specifying a subgraph:

```
Query:
    SELECT    ?subject
    WHERE     { ?subject :is    :Call Note .
                ?subject :ID    :ID Code(234) . }
    Response: :Note(218)
```

Figure 12:
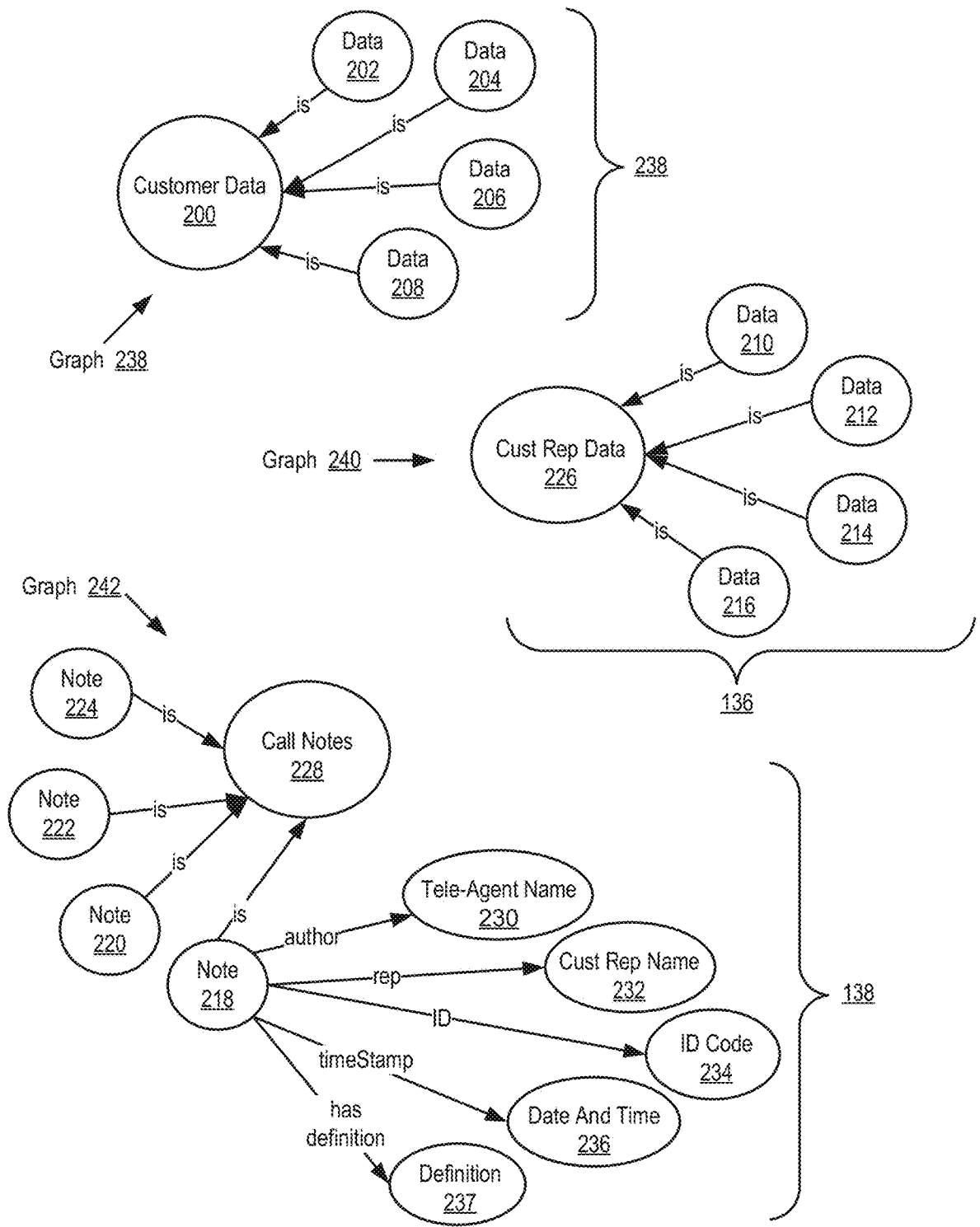
FIG. 12 sets forth an example graph set in which triples regarding customers, customer representatives, and call notes are implemented as separate graphs.

For further explanation, FIG. 12 sets forth an example set of triple stores in which customer data (238), customer representative data (136), and call notes (138) are implemented as separate graphs, (238, 240, 242) respectively. Readers will understand that an enterprise knowledge base will include more than these three kinds of information. The three independent graphs as well as additional such graphs can still implement elements of an overall enterprise knowledge base, except that the administrative processes for such a knowledge base may vary, because at least some of its semantic data is housed in separate graphs. Queries, for example, may be structured differently. Queries against a call notes triple store in a graph like graph (242) may not need a clause specifying any particular subgraph:

```
Query:
    SELECT    ?subject
    WHERE     {?subject :ID :ID Code(234) . }
    Response: :Note(218)
```

Figure 13:
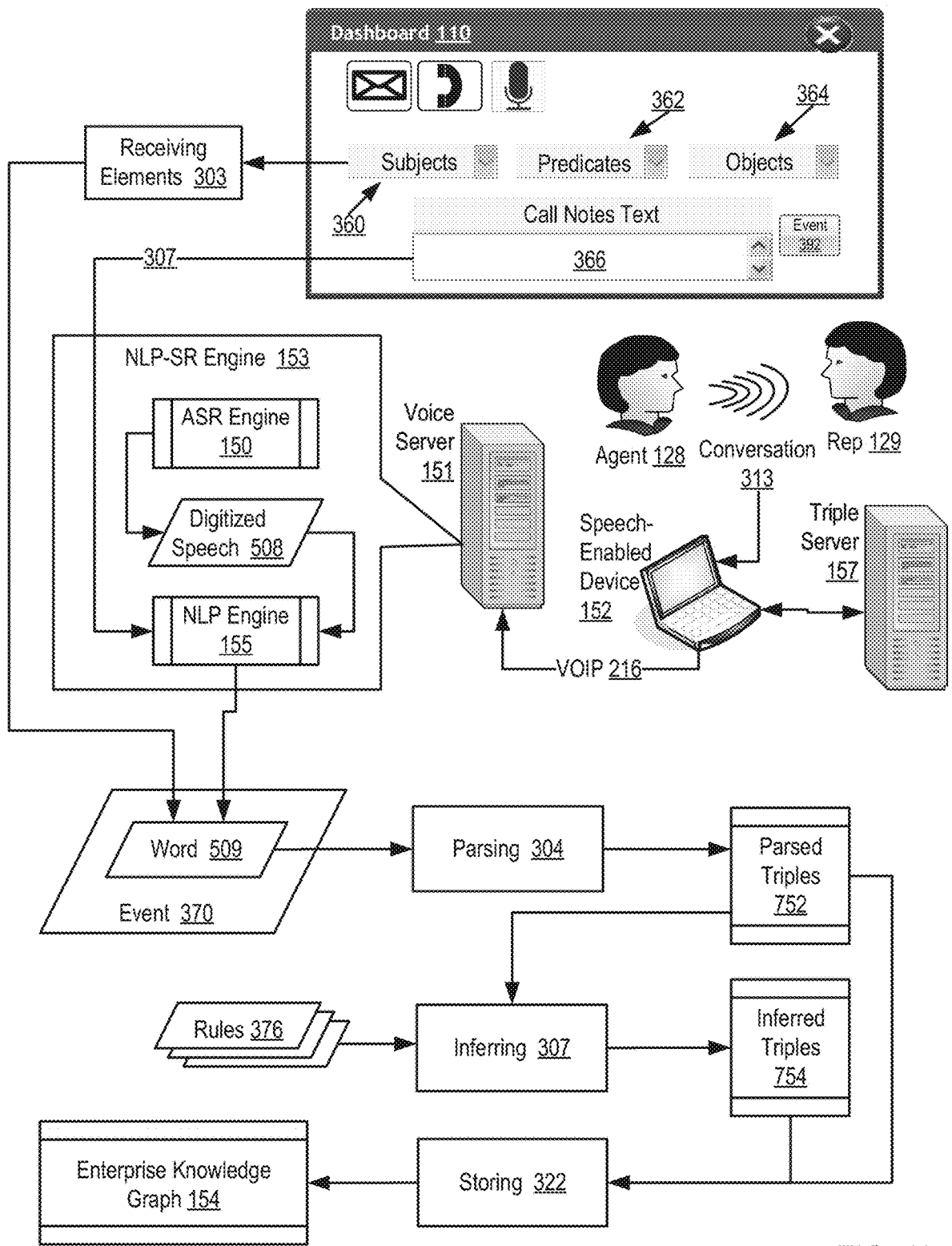
FIGS. 13, 14, and 15 set forth flow charts illustrating further example methods of CRM according to embodiments of the present invention.

For further explanation, FIG. 13 sets forth a flow chart illustrating a further example method of CRM according to embodiments of the present invention. The method of FIG. 13 is similar to the example method of FIG. 10, including as it does parsing (304) into parsed triples (752) words (509) of CRM events (370), inferring (307) inferred triples (754) with inference rules (376) applied to the parsed triples (752), and storing (322) the parsed triples (752) and the inferred triples (754) in an enterprise knowledge graph (154) for use in CRM.

In addition to its similarities to the method of FIG. 10, the method of FIG. 13 includes three alternative ways of acquiring words for inclusion in CRM events and parsing into semantic triples. In a first alternative way of providing a digitized word for parsing, in the method of FIG. 13, parsing (304) can be carried out by parsing a word (509) of digitized speech recognized by a natural language processing speech recognition ("NLP-SR") engine (153) from a conversation (313) between a tele-agent (128) and a customer representative (129). That is, the method of FIG. 13 includes recognizing, by a natural language processing speech recognition ("NLP-SR") engine into digitized speech (508), speech from such a conversation. In this example method, recognizing speech from such a conversation is carried out as follows. Words of speech from the conversation (313) travel through a microphone and amplifier on a speech-enabled device (152) and a VOIP connection (216) to a voice server (151) where an speech recognition engine (150) recognizes the words into a stream of digitized speech (508) which is handed off to a natural language processing engine (155) which processes the digitized speech into sentences and parts of speech and passes the words so processed (509) wrapped in a CRM event (370) to the parsing process (304) where they are parsed into triples (752). This is a first alternative way of providing a digitized word (509) to the parsing process (304).

In a second alternative way of providing a digitized word to the parsing process, the method of FIG. 13 also includes receiving (307) in a natural language processing engine a word of call notes from a text box widget (366) of a CRM dashboard (110). The tele-agent, rather than speaking call notes, types call notes into a GUI text box (366), and all the text so typed is provided by the dashboard (110) directly to a natural language processing engine (155) as digitized words wrapped in a CRM event object. The natural language processing engine sees no difference between typed words (366, 307) and the words in the stream of digitized speech (508). Thus, this second alternative is similar to the first alternative with the exception that there is no need for speech recognition (150), because when a stream of digitized text arrives in the NLP-SR engine (153), the words in the stream are already digitized by typing in through the GUI widget text box (366). The natural language processing engine (155) works the same way as in the first alternative, processing the digitized text from the text box (366) into sentences and parts of speech and passing the words so processed (509), wrapped in an event and CRM type-coded, to the parsing process (304) where they are parsed into triples (752). This is a second alternative way of providing a digitized word (509) to the parsing process (304).

In a third alternative way of providing a digitized word to the parsing process, the method of FIG. 13 also includes receiving (303) into the parsing process (304) a word (509) designated as an element of a parsed triple through widgets (360, 362, 364) of a CRM dashboard (110). The widgets are pull-down menu listings of Subjects for triples (360), Predicates for triples (362), and Objects for triples (364). The Predicates (362) and Objects (364) in many embodiments are triple elements already defined in an ontology supportive of an enterprise knowledge graph (154). The Subjects (360) are a stream of word candidates for inclusion in triples. Words in the Subjects pull-down menu (360) are provided by the NLP-SR engine (153) from call notes text (366) or from words recognized from the conversation (313), for example. The tele-agent (128) passes a word (509) to the parsing process (304) by selecting a word from the Subjects pull-down menu (360), for example, selecting by keyboard or mouse. The tele-agent can optionally also select a Predicate (362) or an Object (364) for inclusion in the same triple with the selected Subject. The tele-agent's selections of predicates and objects in some embodiments can be binding upon the parsing process (304). In other embodiments, the tele-agent's selections are treated by the parsing process merely as recommendations. The parsing process optionally accepts the tele-agent's selections of predicates and objects, or the parsing process makes its own selections of predicates and triples for inclusion with the word (509) in at least one parsed triple (752). This is a third alternative way of providing a digitized word (509) to the parsing process (304).

Figure 14:
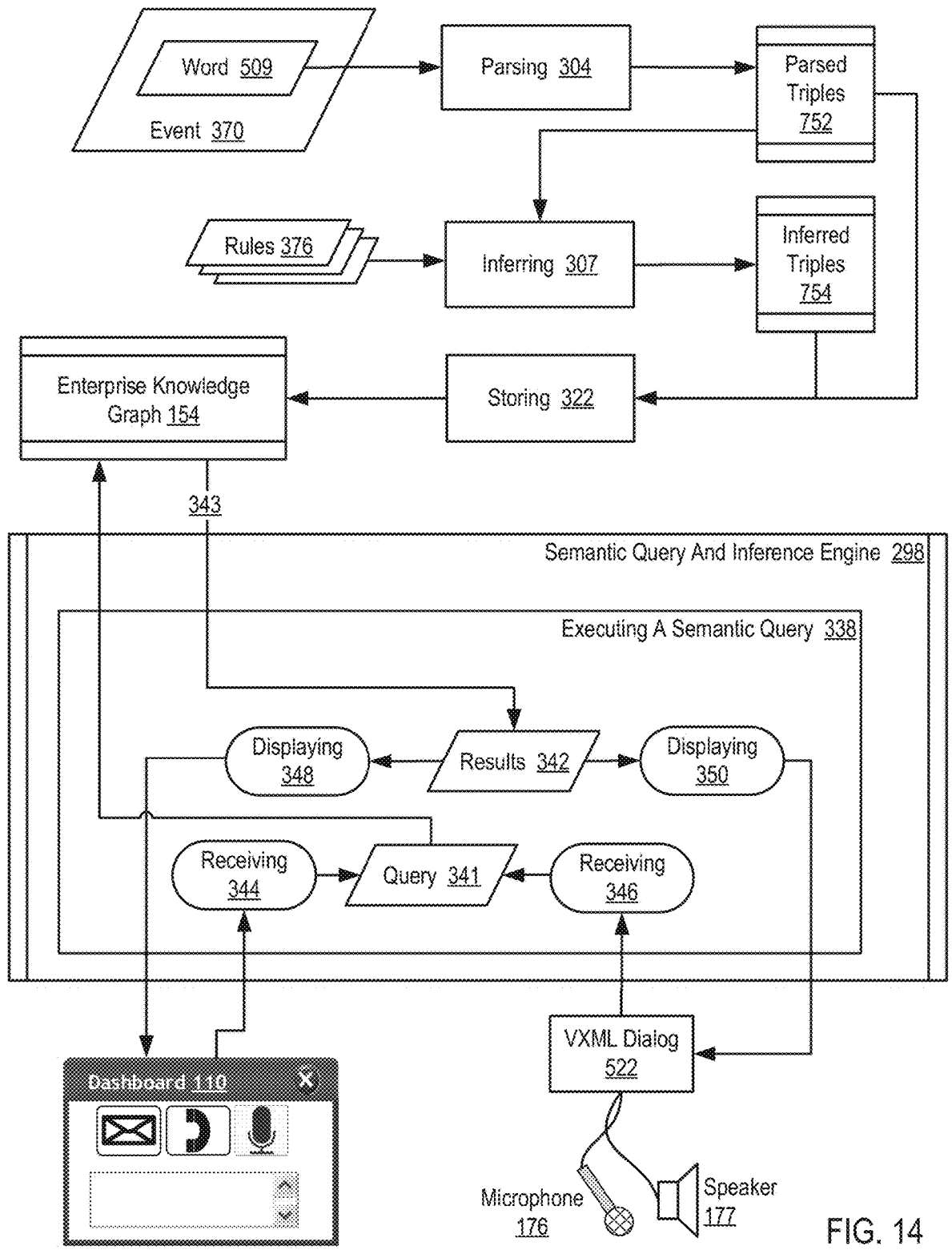

For further explanation, FIG. 14 sets forth a flow chart illustrating a further example method of CRM according to embodiments of the present invention. In particular, the method of FIG. 14 includes executing (338) by a semantic query and inference engine (298) of a computer system against an enterprise knowledge graph (154) a semantic query (341) for a definition of a word recorded in the knowledge graph. The method of FIG. 14 also includes displaying (348, 350) results (342) of the semantic query (341). The definition so sought is in a semantic triple defining a word like word (509) previously parsed (304) or inferred (307) and stored (322) in the enterprise knowledge graph (154).

The method of FIG. 14 is similar to the example method of FIG. 10, including as it does parsing (304) into parsed triples (752) words (509) of CRM events (370), inferring (307) inferred triples (754) with inference rules (376) applied to the parsed triples (752), and storing (322) the parsed triples (752) and the inferred triples (754) in an enterprise knowledge graph (154) for use in CRM. The method of FIG. 14 differs from that of FIG. 10 by including execution of a query, not merely to determine whether a triple is in a triple store, but a type of query (341) that retrieves contents of a triple store (154). The method of FIG. 14 includes executing (338) by a query engine (298) against the enterprise knowledge graph (154) a semantic query (341) for information from triples recorded in the enterprise knowledge graph (154). The semantic query is, for example, received (344) in the query and inference engine through an element of a GUI such a dashboard (110)—or, for a further example, through a speech-enabled user interface such as a microphone (176) and VoiceXML dialog (522). The query and inference engine (298) retrieves (343) and displays (348, 350) the results (342) of the semantic query (342) either back through the GUI (110) or through the speech-enabled user interface (522, 177).

Query (341) does not ask merely whether data is in a store, query (341) asks for the data itself to be returned. Thus, again with reference to the graph regarding Bob and the Mona Lisa, this query, a further example for explanation, which requests predicates and objects from all triples in which Bob is the subject:

```
SELECT        ?predicate ?object
WHERE         {  :Bob     :?predicate    :?subject  .}
returns this:
  :isA                 :person
  :isAFriendOf         :Alice
  :isBornOn            :"the 4th of July 1990"
  :isInterestedIn      :"the Mona Lisa")
This query:
  SELECT      ?predicate ?object
  WHERE       {  :"the Mona Lisa"  :?predicate   :?subject  .}
returns this:
  :wasCreatedBy        :"Leonardo da Vinci"
And this query:
  SELECT      ?subject ?predicate ?object
  WHERE       {  :?subject   :?predicate   :?"the Mona Lisa"  .}
returns this:
  :"the video 'La Joconde a Washington'    :isAbout   :"the Mona Lisa"
```

Figure 15:
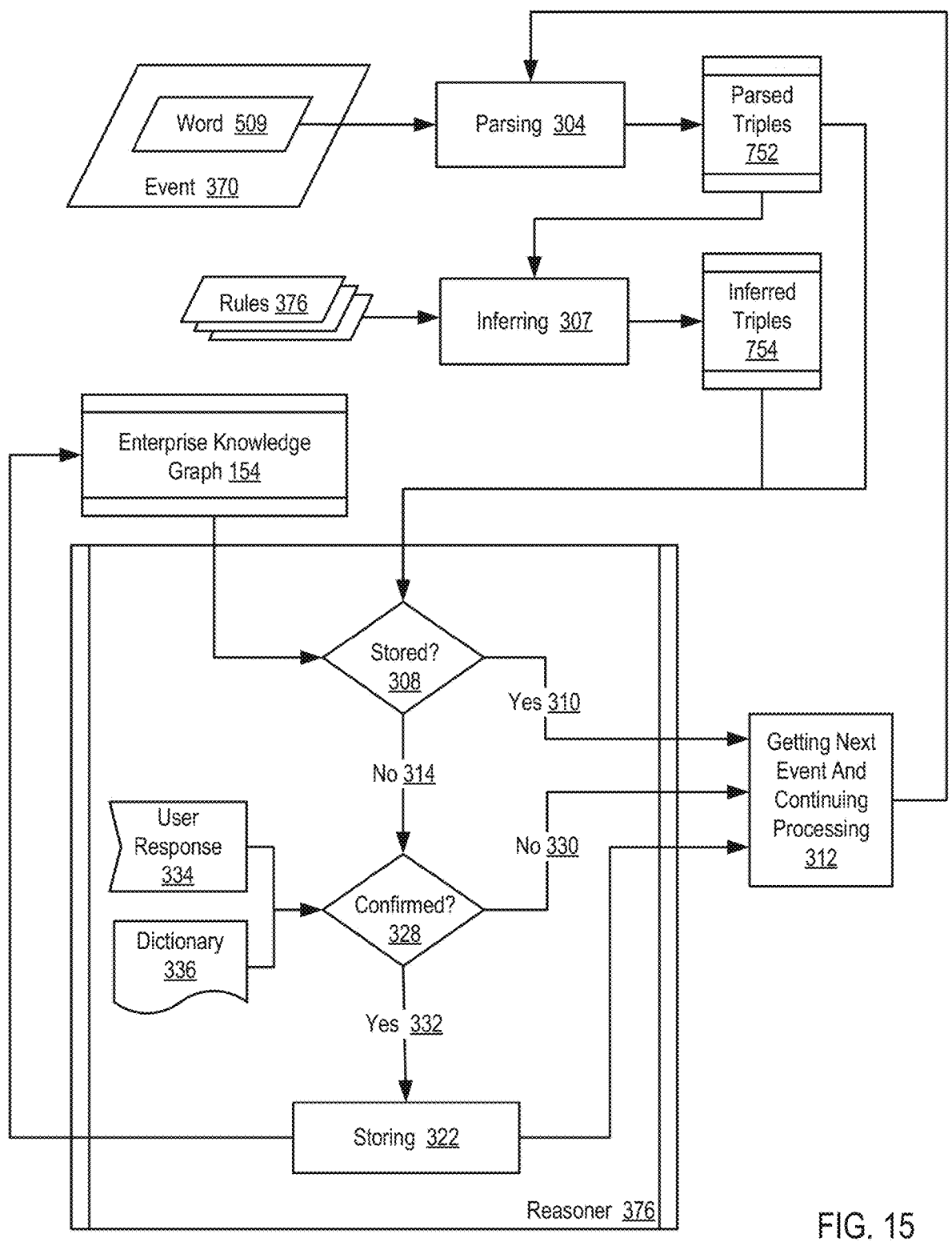

For further explanation, FIG. 15 sets forth a flow chart illustrating a further example method of CRM according to embodiments of the present invention. The method of FIG. 15 is similar to the example method of FIG. 10, including as it does parsing (304) into parsed triples (752) words (509) of CRM events (370), inferring (307) inferred triples (754) with inference rules (376) applied to the parsed triples (752), and storing (322) the parsed triples (752) and the inferred triples (754) in an enterprise knowledge graph (154) for use in CRM.

The method of FIG. 15 differs from that of FIG. 10 by including an additional determination, prior to storing (322), whether parsed or inferred triples are already stored (308) in the enterprise knowledge graph (154). The inference process (307) checks inferences for duplicates of parsed triples (752) and excludes duplicates from the inferred triples (754). Prior to the storage check (308), however, there is nothing in the method of FIG. 15 that checks whether the parsed triples (752) and the inferred triples (754) duplicate triples already stored in the enterprise knowledge graph. For parsed triples (752) and inferred triples (754) that do not duplicate triples already stored in the enterprise knowledge graph, processing continues (314) toward confirmation (328) and storing (322). For parsed triples (752) and inferred triples (754) that do duplicate triples already stored in the enterprise knowledge graph, the method continues (312) by looping around to get a next CRM event and continue processing.

The method of FIG. 15 differs also from that of FIG. 10 by including an additional confirmation (328) that parsed triples (752) and inferred triples (754) actually are to be stored in the enterprise knowledge graph (154). In the example of FIG. 15, a parsed triple or an inferred triple has been determined not recorded (314) in the enterprise knowledge graph. Before recording (322) the pertinent triple in the enterprise knowledge graph, the method of FIG. 15 confirms (328) that the parsed triple in fact should be recorded in the enterprise knowledge graph. If the parsed triple fails confirmation (330), the method proceeds by looping (312) back to get a next CRM event and continue processing.

For further explanation, consider a case in which a user who is a tele-agent in a call center discusses with a customer a prospective sale of residential construction materials. When instructed to do so, through, for example, a VoiceXML dialog, an NLP-SR engine provides to the parser as digitized speech words organized in sentences and identified as parts of speech. The parsing process then can, for example, take the subject, the verb, and a direct object from a sentence and parse them into a triple with a subject, predicate, and object. From this sentence, for example, "Doors are construction materials," the parser can produce (door isA constructionMateral), and pass that triple along to the rest of the process as a candidate parsed triple (752) for inclusion in the enterprise knowledge graph. But these assertions regarding doors are more difficult:

A door is a gateway in time.
Doors are a rock band.
A door is a figure of speech in *The Doors Of Perception* by Aldous Huxley.

It is hard to tell why such results might be found in speech or call notes about residential construction. Perhaps the speech engine made a mistake. Perhaps the tele-agent and the customer representative wandered off topic. All of which makes little difference. The point is that the parsing process will produce triples from these words that are not pertinent to residential construction. Such triples are not likely to be already duplicated in the enterprise knowledge graph because they have nothing to do with CRM for residential construction. In which case, not being found (314) already in the knowledge graph, such triples now become candidates for inclusion in the enterprise knowledge graph despite the fact that such triples do not really belong in the enterprise knowledge graph.

The confirmation process (328) can query a technical dictionary (336) of construction terms. The technical dictionary is unstructured text, no semantics, no triples, but it does contain searchable definitions. If "gateway in time," "rock band," or "*The Doors Of Perception*" do not appear in definitions of doors, the confirmation process can conclude that certain triples do not belong (330) in the enterprise knowledge graph and loop (312) to continue processing. The confirmation process (328) can query a user (334), through, for example, a GUI interface or a speech interface, present a candidate parsed triple or inferred triple, and ask whether to add it to the enterprise knowledge graph. If the user confirms (332), the method records (322) and loops (312). If the user does not confirm (330), the method loops (312) without recording (322).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of customer relationship management ("CRM") implemented in a computer system, the method comprising:
   parsing, by a parsing engine of the computer system, words of a particular CRM event from an incoming stream of CRM events into parsed triples of a description logic, the particular CRM event being an event that generated the words and being of a particular an event type from among multiple different event types that are associated with the CRM events of the stream, and the stream being implemented in a CRM application of the computer system, wherein each parsed triple of the description logic comprises elements including a respective subject, a respective predicate, and a respective object; and
   inferring, by an inference engine, inferred triples from the parsed triples based on inference rules that are specific to the particular event type, wherein the inference rules are implemented as elements of semantic queries comprising logical operators.

2. The method of claim 1 wherein:
   the method further comprises joining the parsed triples to triples of an event-related subgraph of an enterprise knowledge graph of the computer system, wherein the enterprise knowledge graph comprises a plurality of nodes connected by edges, the nodes of the enterprise knowledge graph represent subjects and objects of semantic triples, and the edges of the enterprise knowledge graph represent predicates of the semantic triples; and
   inferring further comprises inferring, by an inference engine from the joined triples according to inference rules that are specific to the particular event type, inferred triples.

3. The method of claim 1 wherein words of a particular CRM event further comprise words from a conversation between a tele-agent and a customer representative that are recognized by a natural language processing speech recognition ("NLP-SR") engine into words of digitized speech.

4. The method of claim 1 wherein words of a particular CRM event further comprise a word from a text box widget of a CRM dashboard implemented in a graphical user interface of the computer system.

5. The method of claim 1 wherein words of a particular CRM event further comprise a word designated as an element of a parsed triple through a widget of a CRM dashboard implemented in a graphical user interface of the computer system.

6. The method of claim 1 wherein CRM events comprise activities of different CRM event types that generate digitized words for parsing into triples that can be included in an enterprise knowledge graph.

7. The method of claim 1 wherein the different event types comprise a digital representation of a new customer generation event type, a new customer representative generation event type, and new call notes generation event type.

8. The method of claim 1 further comprising storing a parsed triple in an enterprise knowledge graph of the computer system.

9. The method of claim 1 further comprising storing an inferred triple in an enterprise knowledge graph of the computer system.

10. The method of claim 1 further comprising:
    determining whether the parsed triples and the inferred triples are already asserted in an enterprise knowledge graph of the computer system; and
    storing in the enterprise knowledge graph only those parsed triples and inferred triples that are not already in the enterprise knowledge graph.

11. The method of claim 1 wherein the description logic is a member of a family of formal knowledge representation languages in which a query of the logic is decidable.

12. The method of claim 1 wherein the computer system comprises an enterprise knowledge graph composed of triples of the description logic comprising all CRM-related knowledge that is available to a tele-agent through the computer system.

13. A computer system that implements customer relationship management ("CRM"), the computer system comprising a computer processor operatively coupled to computer memory, the computer processor configured to perform operations comprising:
parsing, by a parsing engine of the computer system, words of a particular CRM event from an incoming stream of CRM events into parsed triples of a description logic, the particular CRM event being an event that generated the words and being of a particular an event type from among multiple different event types that are associated with the CRM events of the stream, and the stream being implemented in a CRM application of the computer system, wherein each parsed triple of the description logic comprises elements including a respective subject, a respective predicate, and a respective object; and
inferring, by an inference engine, inferred triples from the parsed triples based on inference rules that are specific to the particular event type, wherein the inference rules are implemented as elements of semantic queries comprising logical operators.

14. The computer system of claim 13 wherein:
the computer processor configured to function by joining the parsed triples to triples of an event-related subgraph of an enterprise knowledge graph of the computer system, wherein the enterprise knowledge graph comprises a plurality of nodes connected by edges, the nodes of the enterprise knowledge graph represent subjects and objects of semantic triples, and the edges of the enterprise knowledge graph represent predicates of the semantic triples; and
inferring further comprises inferring, by an inference engine from the joined triples according to inference rules that are specific to the particular event type, inferred triples.

15. The computer system of claim 13 wherein words of a particular CRM event further comprise words from a conversation between a tele-agent and a customer representative that are recognized by a natural language processing speech recognition ("NLP-SR") engine into words of digitized speech.

16. The computer system of claim 13 wherein words of a particular CRM event further comprise a word from a text box widget of a CRM dashboard implemented in a graphical user interface of the computer system.

17. The computer system of claim 13 wherein words of a particular CRM event further comprise a word designated as an element of a parsed triple through a widget of a CRM dashboard implemented in a graphical user interface of the computer system.

18. The computer system of claim 13 wherein CRM events comprise activities of different CRM event types that generate digitized words for parsing into triples that can be included in an enterprise knowledge graph.

19. The computer system of claim 13 with the computer processor further configured to function by storing parsed triples and inferred triples in an enterprise knowledge graph of the computer system.

20. The computer system of claim 13, wherein the operations comprise:
determining whether the parsed triples and the inferred triples are already asserted in an enterprise knowledge graph of the computer system; and
storing in the enterprise knowledge graph only those parsed triples and inferred triples that are not already in the enterprise knowledge graph.

* * * * *